Fig. 4A
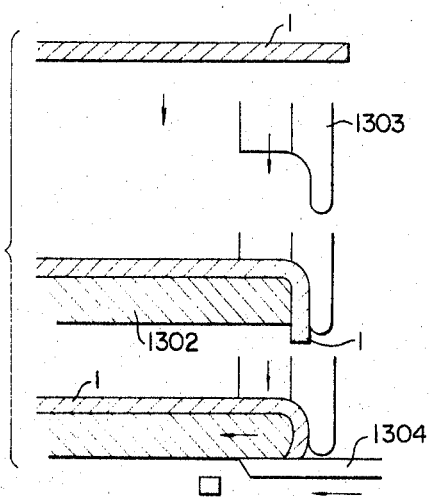
Fig. 4B
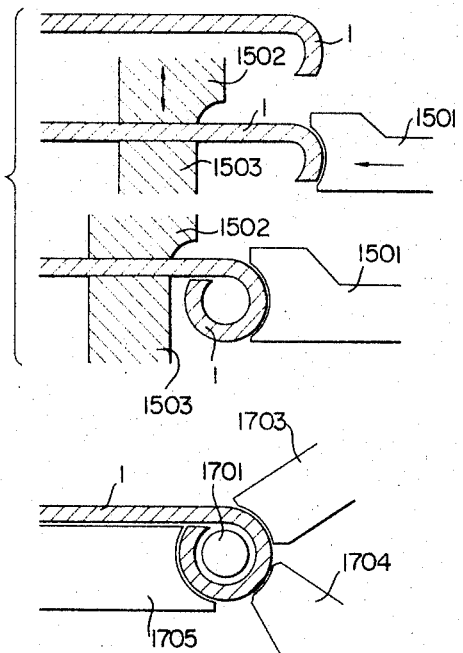
Fig. 4C

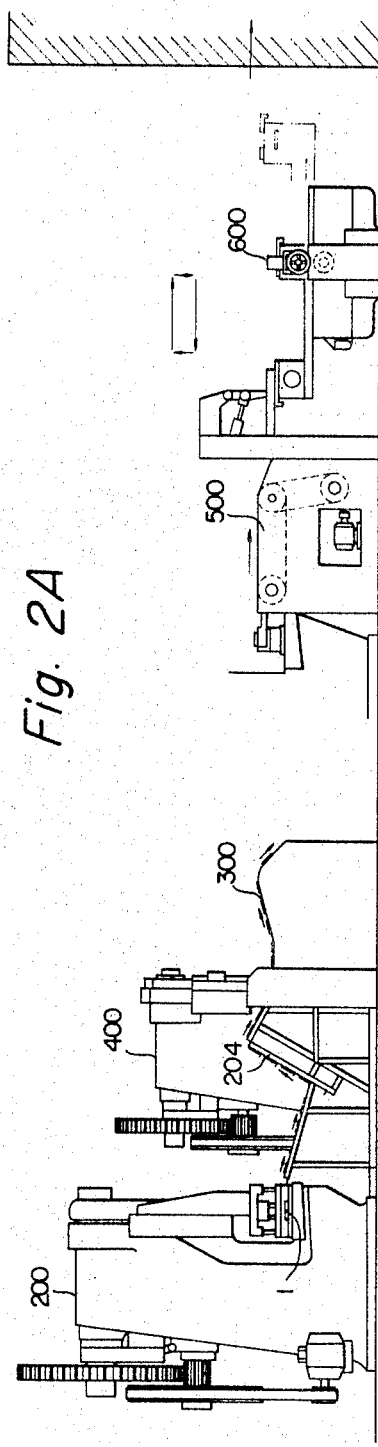
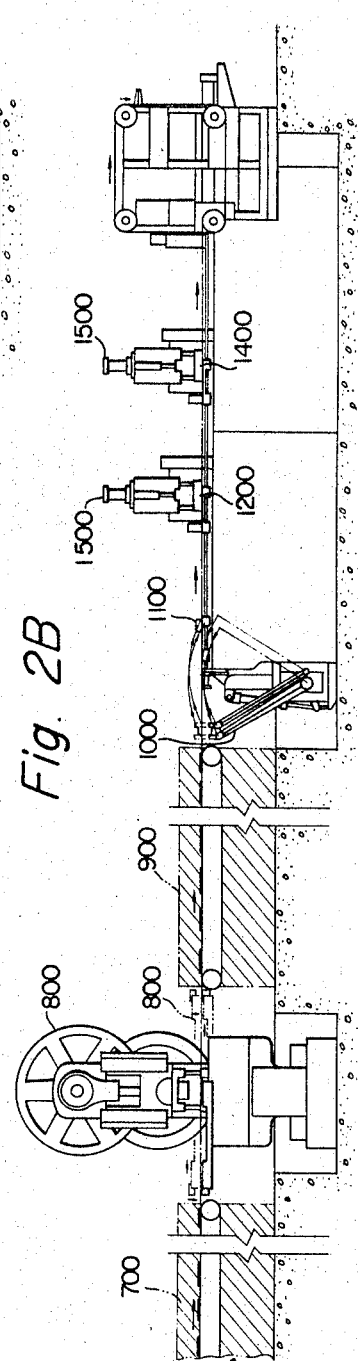
Fig. 2A
Fig. 2B

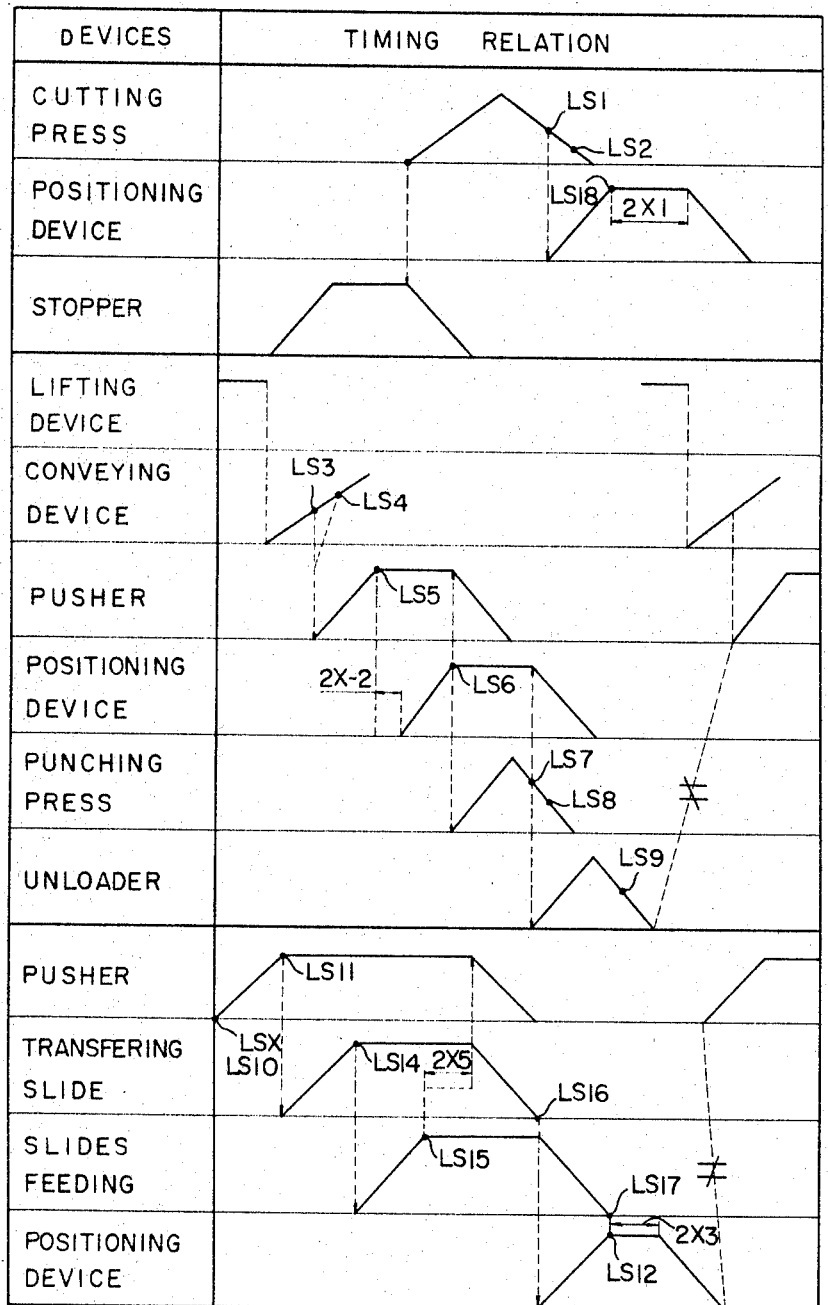

Fig. 11G

United States Patent Office 3,453,855
Patented July 8, 1969

3,453,855
METHOD OF AUTOMATICALLY PRODUCING LEAF SPRINGS HAVING AN EYE AT BOTH ENDS THEREOF AND AUTOMATIC EYE FORMING MACHINE
Motoo Morita, 3–12 Uramonzen-cho, Naka-ku, Nagoya-shi, Aichi-ken, Japan
Filed Apr. 17, 1967, Ser. No. 631,282
Int. Cl. B21d *11/02, 11/04, 17/16*
U.S. Cl. 72—296                                                9 Claims

ABSTRACT OF THE DISCLOSURE

Method of automatically producing leaf springs having an eye at both ends thereof. A strip of metal material is automatically cut, and a hole is punched at the center. Both ends are heated and the strip is at the center hole and fed to an eye forming apparatus to form eyes at both ends thereof. An automatic eye forming machine. The apparatus has a shearing unit for cutting strip metal material, a punching unit for producing a center hole in the cut material, a heating furnace for heating both ends thereof, feeding devices for chucking the material at the center hole, and eye forming equipment for forming eyes at both ends thereof.

BACKGROUND OF THE INVENTION

This invention relates to a method of automatically producing eye formed leaf springs at both ends thereof and an automatic eye forming machine, and more particularly is directed to a method comprising the steps of at least automatically cutting strip metal material, punching a hole at its center, heating both ends thereof, trimming both ends thereof, reheating both ends thereof, chucking at its center hole thereof, and forming eyes at both ends thereof; to an automatic eye forming machine which comprises at least a shearing unit for cutting strip metal material, a punching unit for producing a center hole at the cut material, a heating furnace for heating both ends thereof, feeding devices for chucking the material at its center hole, and eye forming equipment for forming eyes at both ends thereof.

Heretofore, a method of producing eye formed leaf springs at both ends such as, for example, used for supporting a frame of vehicle has been provided manually in such a manner as having the steps of cutting strip metal material by means of a shearing unit at a predetermined length, feeding the cut material into a punching unit for producing a center hole at the cut material, punching the material so as to make a center hole thereof for mounting overlapped leaf springs at, for example, automobile or vehicle by means of the punching unit, feeding the material into a heating furnace for heating it at both ends so as to work easily, selectively trimming the material at both ends if required, by means of a trimming unit, feeding it into a reheating furnace when trimmed for heating again the material at both ends, reheating the material at both ends in the reheating furnace, feeding the reheated material into an eye forming equipment, curling, in turn, the fed material at respective ends, by means of a curling unit, and forming the curled material, in turn, into eye shape at respective curled ends. Further, there has been provided with an eye forming machine which comprises a shearing unit for cutting strip metal material at a predetermined length, a punching unit for producing a center hole at the cut material, a heating furnace for heating both ends thereof so as to work easily, selectively if required a trimming unit for trimming the material at both ends in turn, a reheating furnace for heating again the material at both ends for easily working, curling unit for curling, in turn, the material at respective ends, and an eye forming equipment for finally forming the curled material, in turn, into eye shape at respective ends.

According to the conventional method of producing eye formed leaf springs at both ends and eye forming machine, the span length from the center hole of the leaf spring to the eye formed has been not accurate and uniform between the products in spite of the fact that the span length from the center hole to the eye is important to determine the characteristics of the leaf spring when operated with the vehicles.

Furthermore, in the conventional method and machine for producing eye formed leaf springs at both ends, the roundness and cylindricity of the eye of the leaf spring at both ends have not been accurate, causing the spring to be in unstable operation or function as spring mountings when used for the frame of the vehicle, resulting that the worse characteristics and irregularity of its operation has been effected.

SUMMARY OF THE INVENTION

This invention eliminates the aforementioned disadvantages over the conventional method and machine for producing eye formed leaf springs at both ends.

In one aspect of this invention, there is provided a method of automatically producing eye formed leaf springs at both ends thereof which comprises the steps of automatically cutting strip metal material by means of a shearing unit at a predetermined length, feeding the cut material into a punching unit for producing a center hole thereof at the cut material by a first transferring unit, punching the material in order to make a center hole thereof for mounting overlapped leaf springs at, for example, vehicle or the like by means of the punching unit, feeding the material by means of a second transferring device into an end heating furnace for heating it at both ends so as to work easily together with positioning the material longitudinally along with the lengthwise direction by means of a second positioning device so as to effect uniform end heating at the next heating furnace with the material being transferred advancedly to the crosswise direction, selectively when required trimming the material at both ends at the same time by means of a trimming unit, feeding the material into an end reheating furnace when trimmed for reheating again the material at both ends by means of a third transferring unit, reheating the material at both ends in the end reheating furnace so as to effect easy operation and economic power consumption of the press used in the operation, feeding the end reheated material into a positioning device for automatically positioning the material in lateral and longitudinal directions so as to effect uniform products by means of a swinging arm feeder, positioning the material in lateral and longitudinal directions by means of a second positioning device, chucking the material at its center hole by the operations of a pin projected into the center hole of the material and of a chucking arm covered over the material from and by means of a first transferring slide, sliding the chucked material by the first transferring slide into a first working station, clamping the chucked material at both sides of the center hole by means of a first clamping device, unchucking the chucked material by the first transferring slide and advancing the clamped material into the first working station immediately thereafter for the first transferring slide initiating to return to its original position so as to transfer the following material, curling both ends of the material at the same time clamped by the clamping device about half of the circle by means of a first working press and cutting both the top ends at a predetermined length at the same time by an end shearing units at the first working station, chucking the material at its center hole by the same operation as the first transferring slide by means of a second transferring slide, sliding the chucked material by the second transferring slide into a second working station, clamping the chucked material at both sides of the center hole by means of a second clamping device, unchucking the chucked material by the second transferring slide immediately thereafter for the second transferring slide initiating to return to its original position so as to transfer the following material, forming eyes at both ends of the material by pressing the material inward from the outside of the curled ends at the same time by means of an eye forming press at the second working station, chucking the material at its center hole by the same operation as the first transferring slide by means of the third transferring slide, sliding the chucked material by the third transferring slide into the third working station, clamping the chucked material at both sides of the center hole by means of the third clamping device, unchucking the chucked material by the third transferring slide immediately thereafter for the third transferring slide initiating to return to its original position so as to transfer the following eye formed material at the second station, forming finally eye at the third working station by means of a final eye forming device by the steps of at first mandrel end receivers being approached to the material and mandrels being inserted into both the eyes of the material, secondly pressing the material by No. 1 and No. 2 dies and thirdly No. 3 dies being pressed around the peripheries of the eye configuration of the material at a predetermined interval from the furthest die from the end and interval of the pressing die at both ends at the same time, fourthly the mandrel being drawn from the both ends, the material being fed out of the eye of the material.

In another aspect of the invention, there is provided an automatic eye forming system which comprises a leaf material feeding conveyor for feeding leaf material, a shearing unit for automatically cutting strip metal material at a predetermined length, a first transferring device for feeding the cut material into a punching unit for producing a center hole thereof at the cut material, a punching unit for producing a center hole at the cut material for mounting overlapped leaf springs at, for example, vehicle or the like, a second transferring device for feeding the strip material into an end heating furnace for heating it at both ends so as to work easily, a first positioning device for positioning the material longitudinally in alignment in the lengthwise direction so as to effect uniform end heating at the next heating furnace with the strip material being transferred advancedly to the crosswise direction, an end heating furnace for heating both ends of the material so as to effect easy operation and economic trimming operation when the trimming is required for the material, selectively when required a trimming unit for trimming the strip material at both ends at the same time, a third transferring device for feeding the strip material into an end reheating furnace when trimmed for heating again the material at both ends, an end reheating furnace for heating again both ends of the material so as to effect easy operation and economic power consumption of the press used in operation, a swinging arm feeder for feeding the end reheated material into a second positioning device so as to effect uniform products, a second positioning device for positioning the material in lateral and longitudinal directions so as to effect to produce uniform products, a first transferring slide for chucking the material at its center hole by the operations of a pin projected into the center hole of the material and of a chucking arm covered over the material therefrom and for sliding the chucked material thereby into a first working station, a first clamping device for clamping the chucked material at both sides of the center hole thereafter the first transferring slide initiating to return to its original position so as to transfer the following material, a bending press for curling both ends at the same time of the material clamped by the clamping device about half of a circle and an end shearing units for cutting both top ends thereof at a predetermined length at the same time at the first working station, a second transferring slide for chucking the material at its center hole by the same operation as the first transferring slide and for sliding the chucked material thereby into a second working station, a second clamping device for clamping the chucked material at both sides of the center hole thereafter the second transferring slide initiating to return to its original position so as to transfer the following material, an eye forming press for forming eyes at both ends of the material by pressing the material inward from the outside of the curled ends at the same time at the second working station, a third transferring slide for chucking the material at its center hole by the same operation as the first transferring slide and for sliding the chucked material thereby into a third working station, a third clamping device for clamping the chucked material at both ends of the center hole thereafter the third transferring slide initiating to return to its original position so as to transfer the following material, a final eye forming device for forming finally eye at the third working station comprising mandrel end receivers and for accepting the end of mandrel through the eyes of the material mandrels being inserted into both the eyes of the material, No. 1, No. 2 and No. 3 dies of a third working press being pressed into both the peripheries of the eye configuration of the material at a predetermined order from the furthest slide from the end and interval of the pressing slides at both ends at the same time, then the mandrel being drawn from the both ends and the last transferring device for feeding out the material finally from the eye forming equipment.

In a still further aspect of this invention, there is provided a method for automatically producing eye formed leaf springs at both ends thereof which in addition to the aforementioned method comprises the steps of automatically pouring water or the like as a coolant for respective dies of the presses used therein immediately before the dies operate to press the material in order to keep long life thereof and accuracies of the eyes by means of cooling system and lubricating all of the units and devices during operation by means of lubricating system under constant pressure, further taking out scraps coming out from the unit by means of scrap conveyor.

In still another aspect of this invention, there is provided an automatic eye forming machine which comprises in addition to the abovementioned machine cooling system for cooling respective dies of the presses used therein immediately before the dies thereof operate to press the material in order to keep long life thereof and accuracies of the eyes of the material, lubricating system for providing the lubrication of all of the units and devices during operation under constant pressure, scrap conveyor for taking out the scraps coming out from the unit and devices in the machine.

Therefore, one object of this invention is to provide a method of automatically producing eye formed leaf springs at both ends thereof.

Another object of this invention is to provide an automatic eye forming system for leaf springs at both ends.

A still further object of this invention is to provide a method of automatically producing accurate eye formed leaf springs at both ends thereof.

Still another object of this invention is to provide an automatic eye forming system for forming accurate eye formed leaf springs at both ends thereof.

Still another object is to provide an automatic eye forming system for mass production thereof and fast production thereof.

A further object is to provide a transferring slide for carrying center-holed leaf spring for forming accurate eye formed leaf spring by securing the material at its center hole.

Still another object of this invention is to provide an eye forming equipment for forming eye at both ends of a strip material for forming accurate and fast eye formed leaf springs with automatic and mass production.

*Brief description of the drawings*

FIGS. 2A and 2B are schematic side views of the automatic eye forming system shown in FIG. 1;

FIGS. 4A through 4C are operational side views of the steps of curling, end of the material, forming eye at the end of the material and forming finally eye in accuracy, respectively, of the eye forming equipment in the automatic eye forming machine of this invention;

FIG. 6 is a timing graph showing time relation of the operation between devices or units;

Figure 11G:
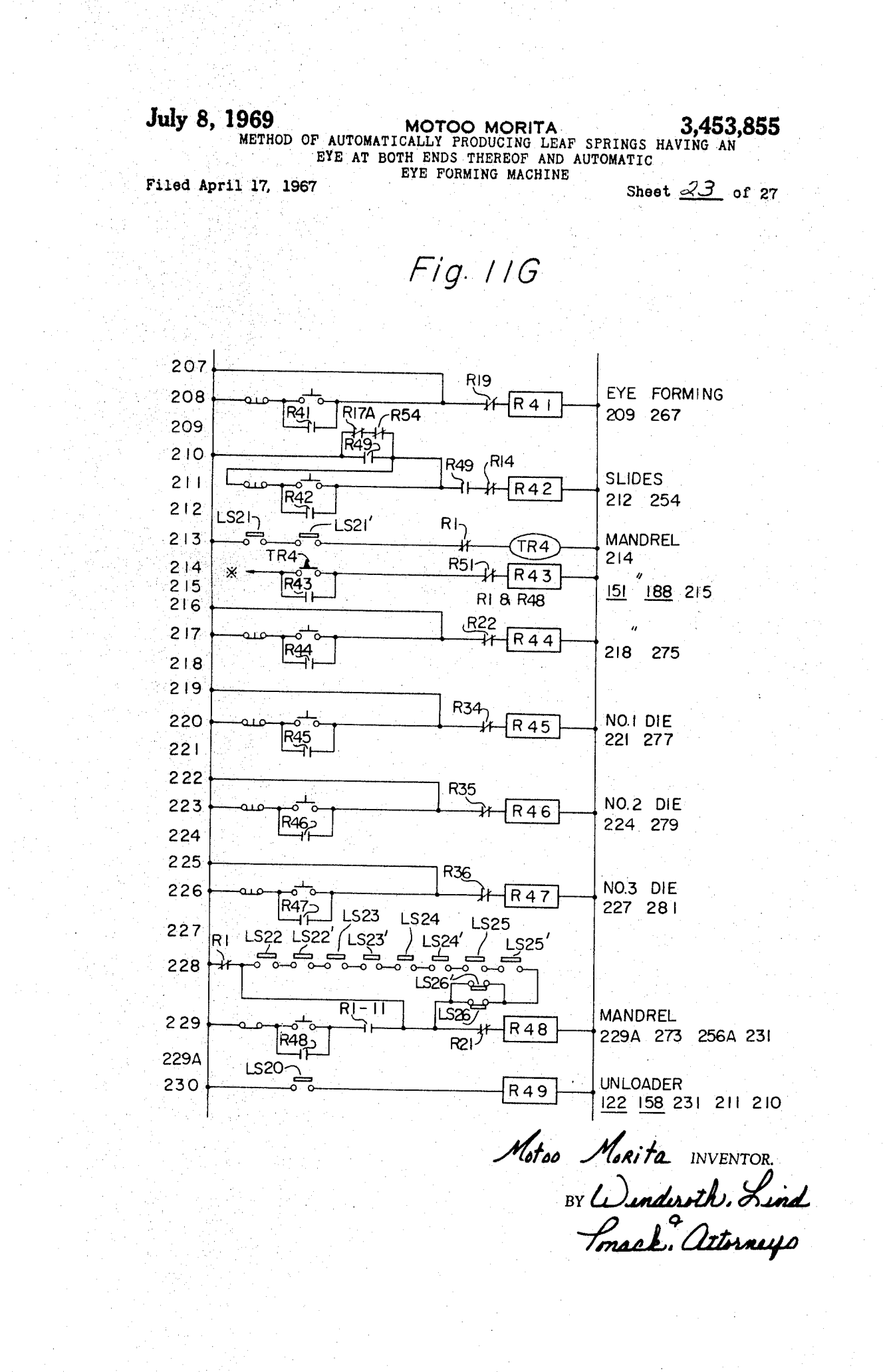

FIGS. 11A through 11M are electrical circuits for controlling the operation of the eye forming equipment of the automatic eye forming machine.

DESCRIPTION OF THE PREFERRED EMBODIMENT

Figure 1:
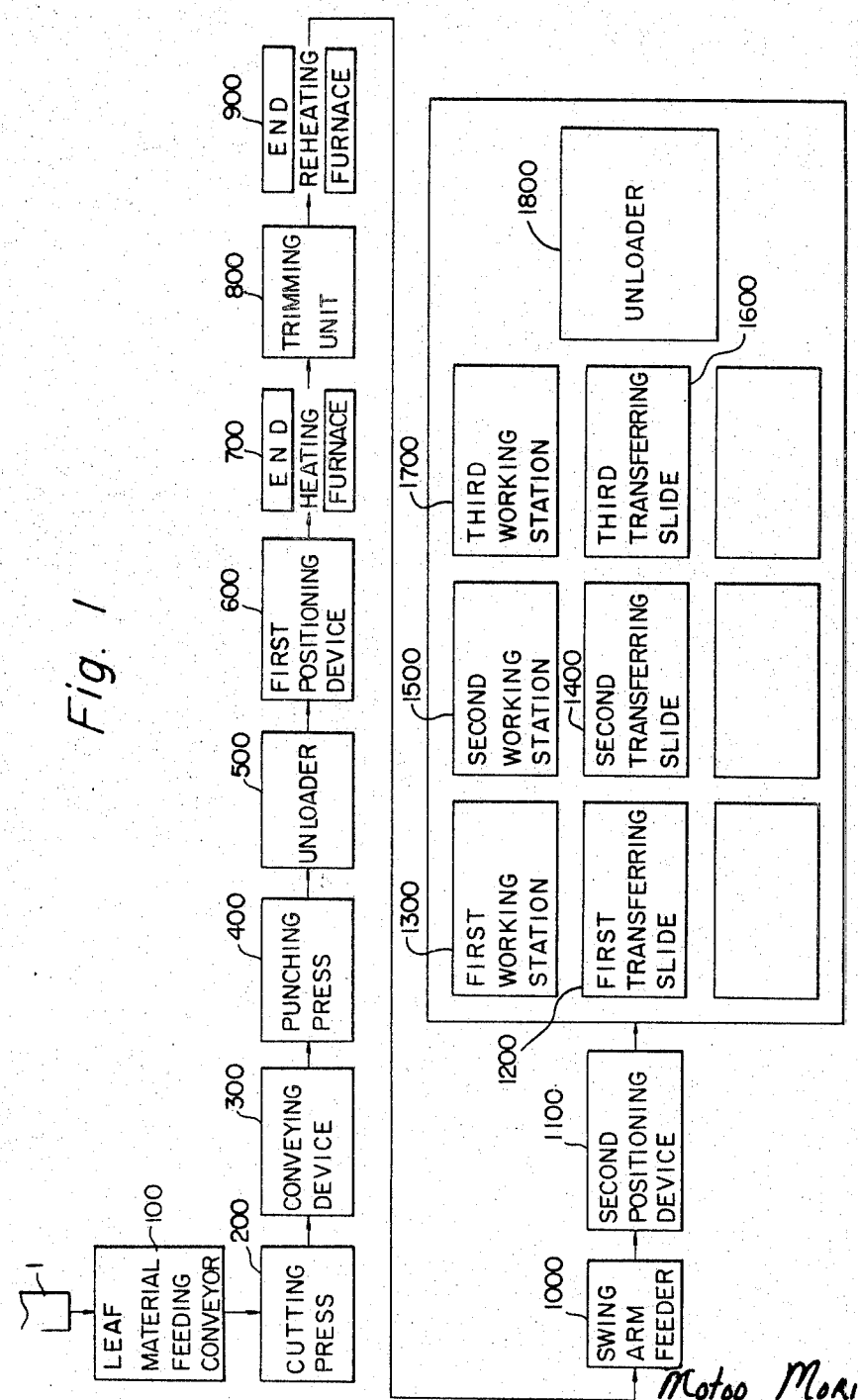
FIG. 1 is a block diagram of an embodiment of this invention showing an automatic eye forming system.
Figure 3A:
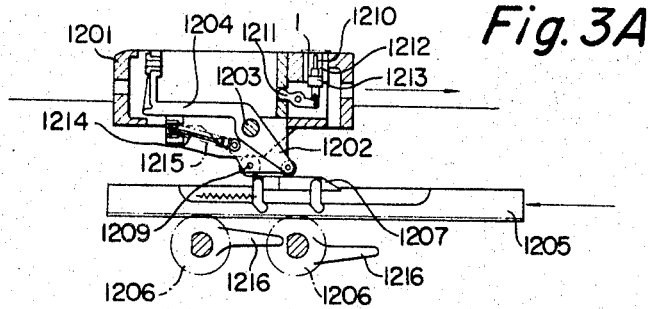
FIGS. 3A through 3D are elevational side views of embodiments of this invention showing transferring slide for chucking the material in operation by the steps of start, first medium, second medium and chucking, respectively, of the automatic eye forming machine in accordance with this invention.
Figure 3B:
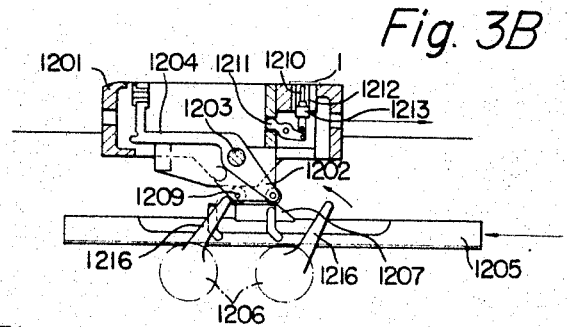
Figure 3C:
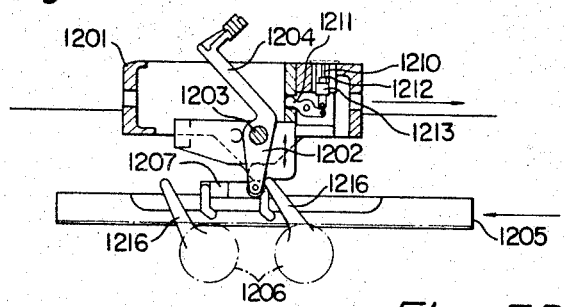
Figure 3D:
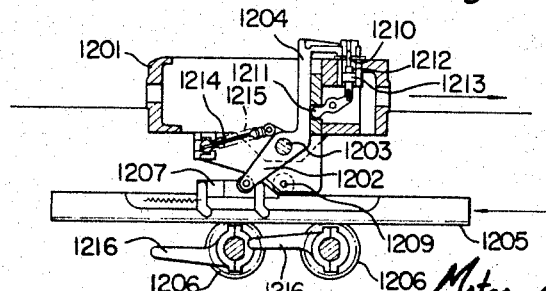
Figure 5A:
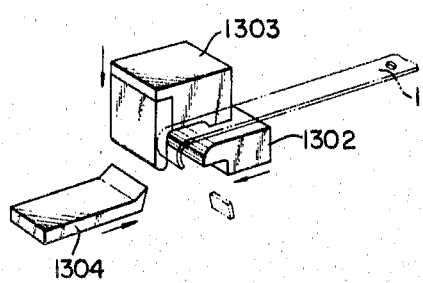
FIGS. 5A through 5C are perspective views of the first, second and third working station in principle of its arrangement of respective presses, cutter and dies in the eye forming equipment in the automatic eye forming machine according to this invention.
Figure 5B:
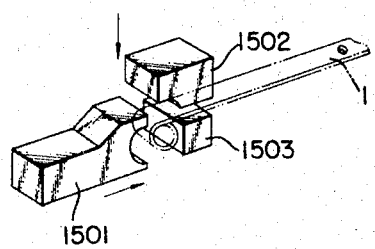
Figure 5C:
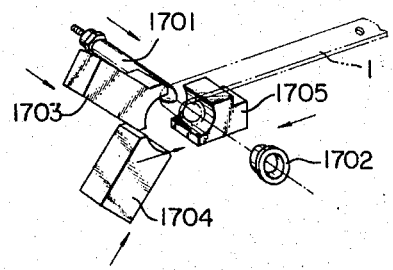
Figure 7A:
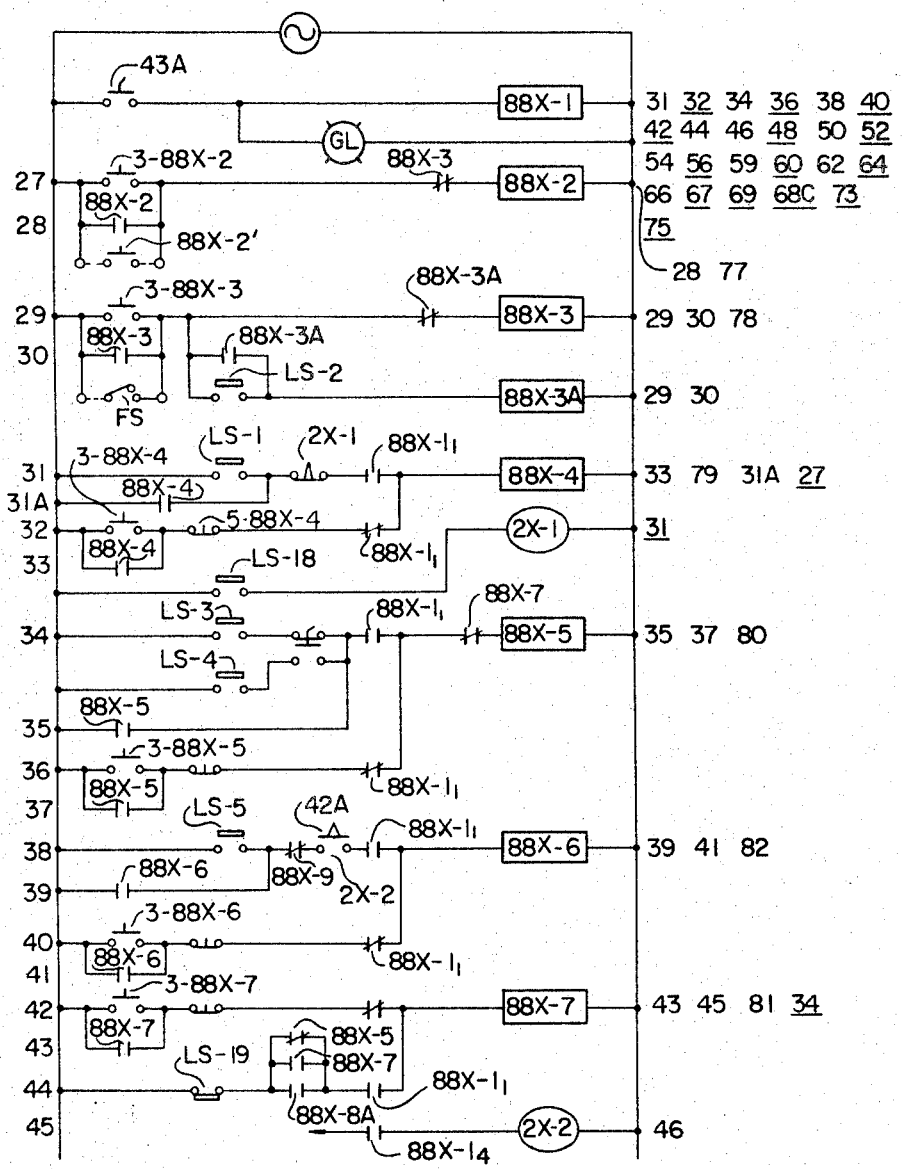
FIGS. 7A through 7D are electrical circuits for controlling the operation from a shearing unit to a punching unit in the automatic eye forming machine.
Figure 7B:
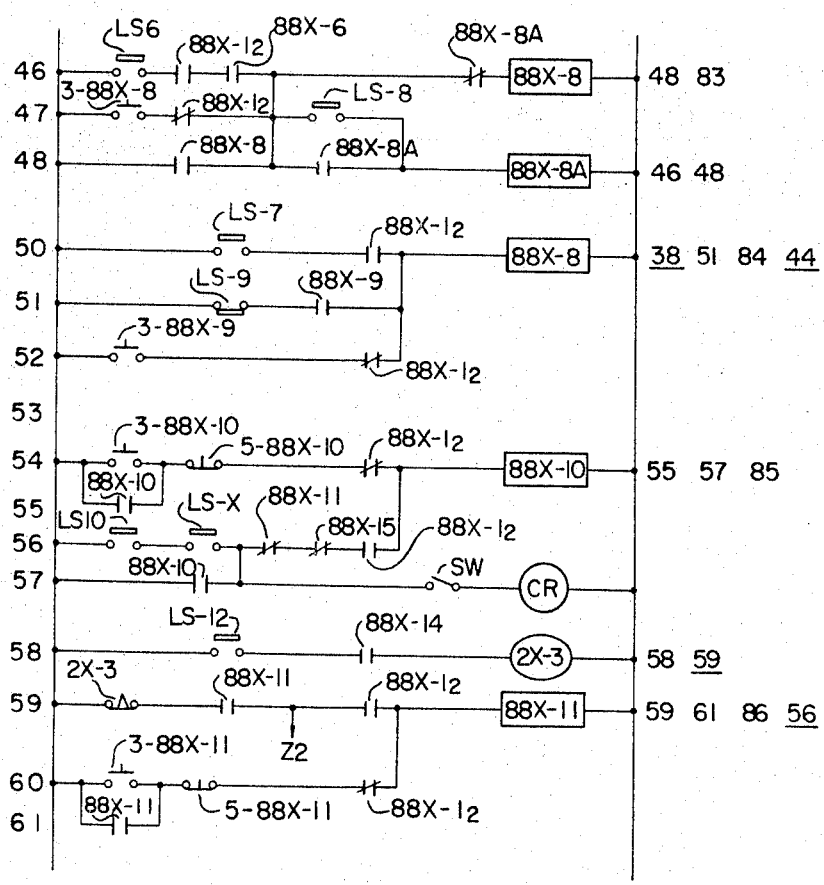
Figure 7C:
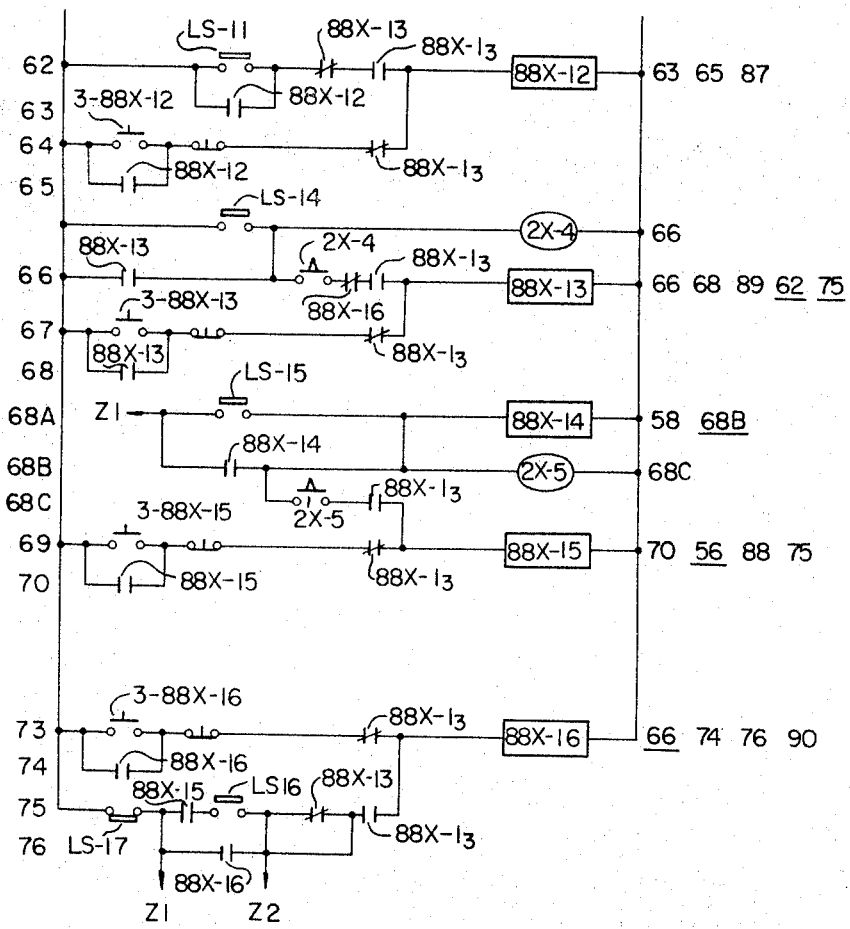
Figure 7D:
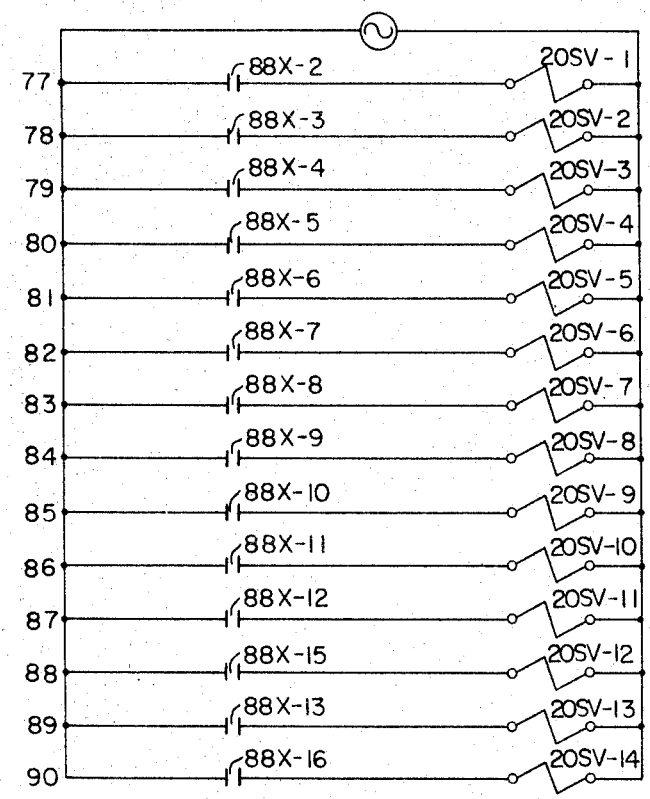
Figure 8:
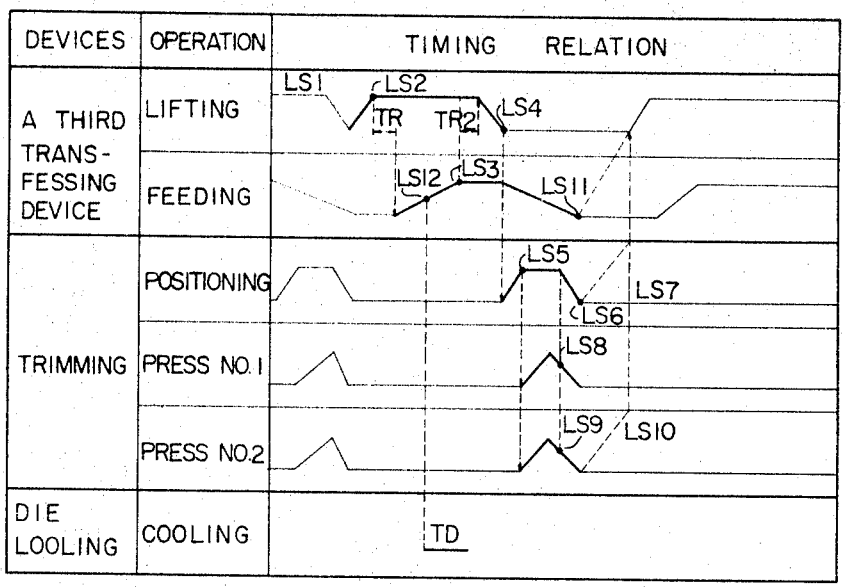
FIG. 8 is a timing graph showing time relation of the operation between devices or units.
Figure 9A:
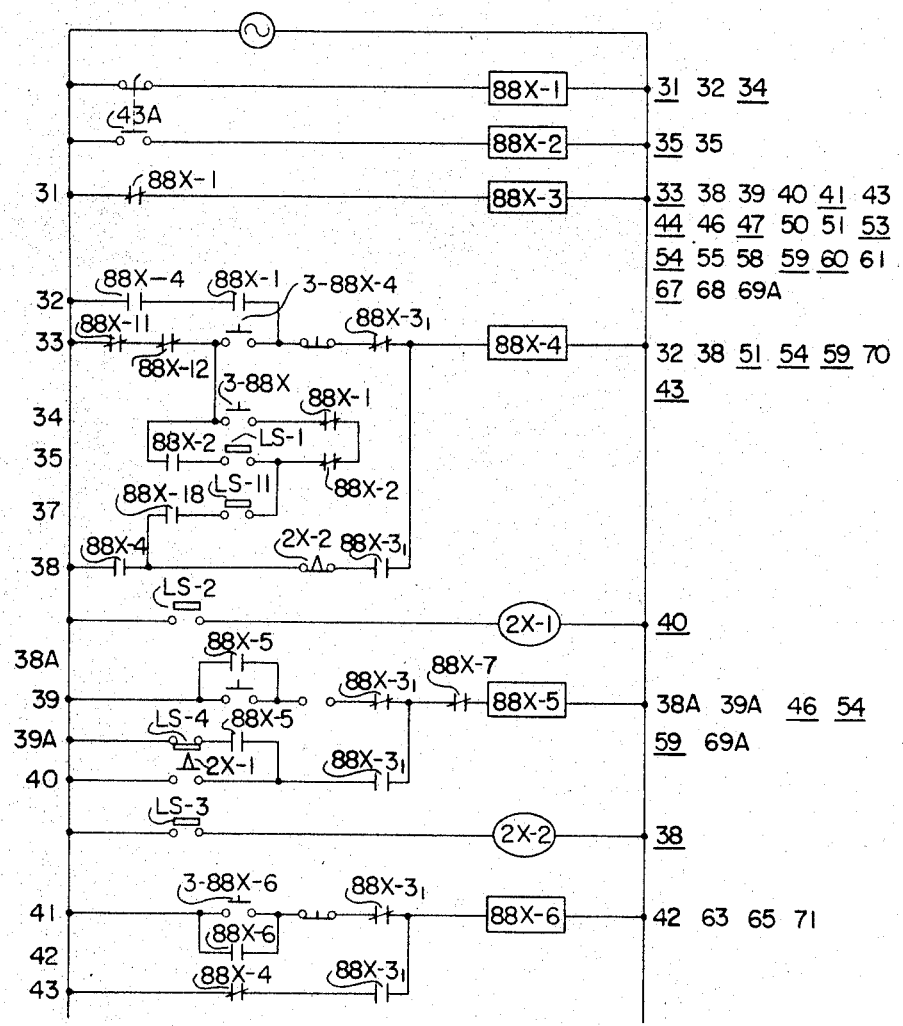
FIGS. 9A through 9D are electrical circuits for controlling the operation of a trimming unit in the automatic eye forming machine.
Figure 9B:
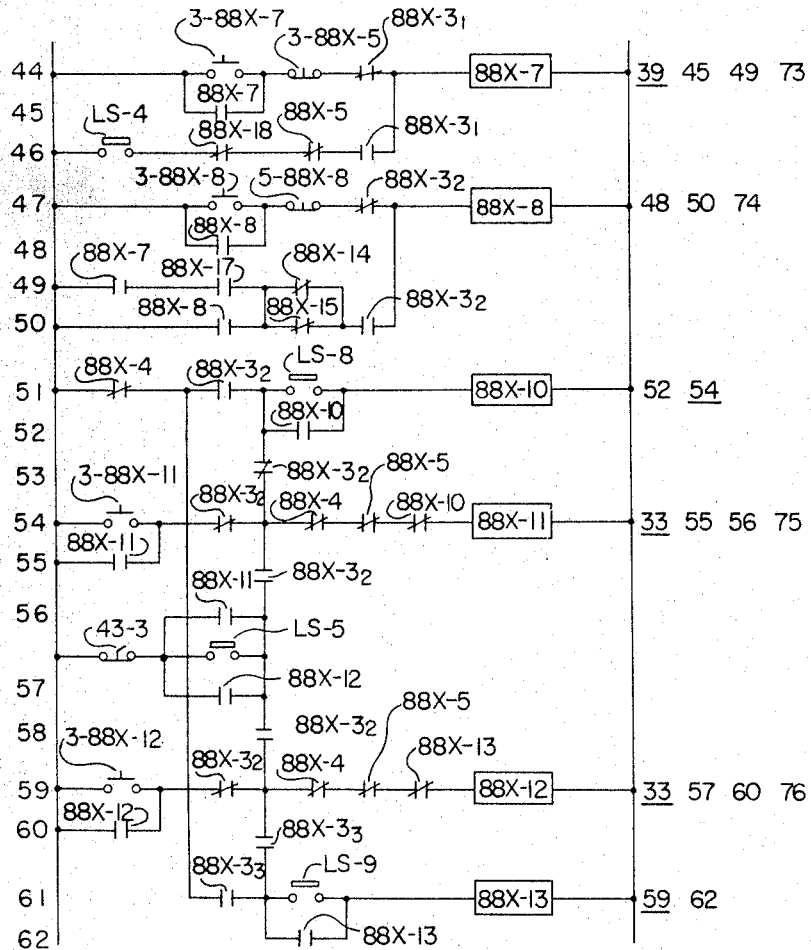
Figure 9C:
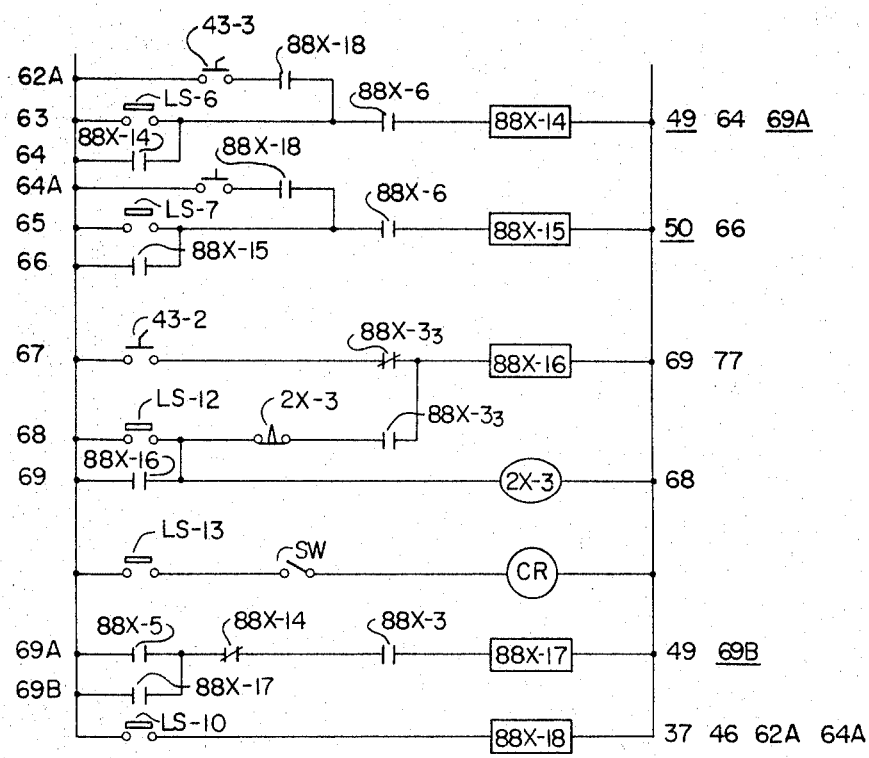
Figure 9D:
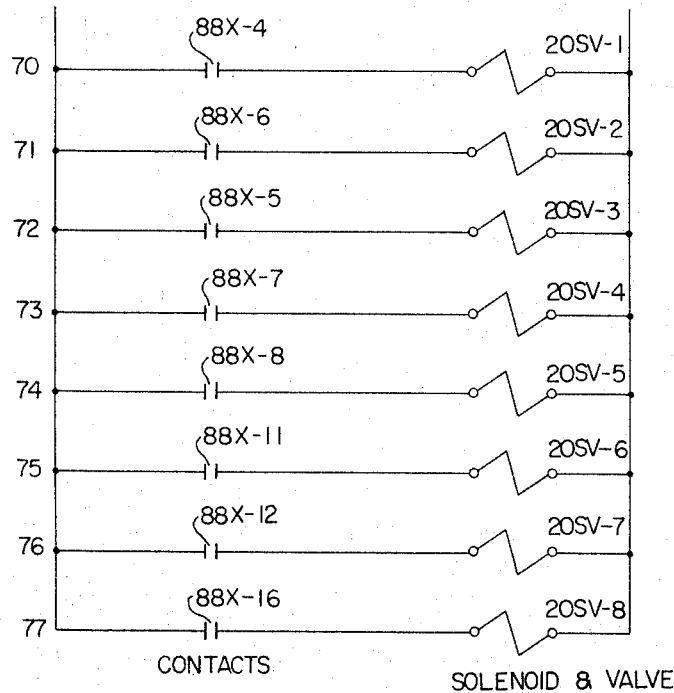
Figure 10:
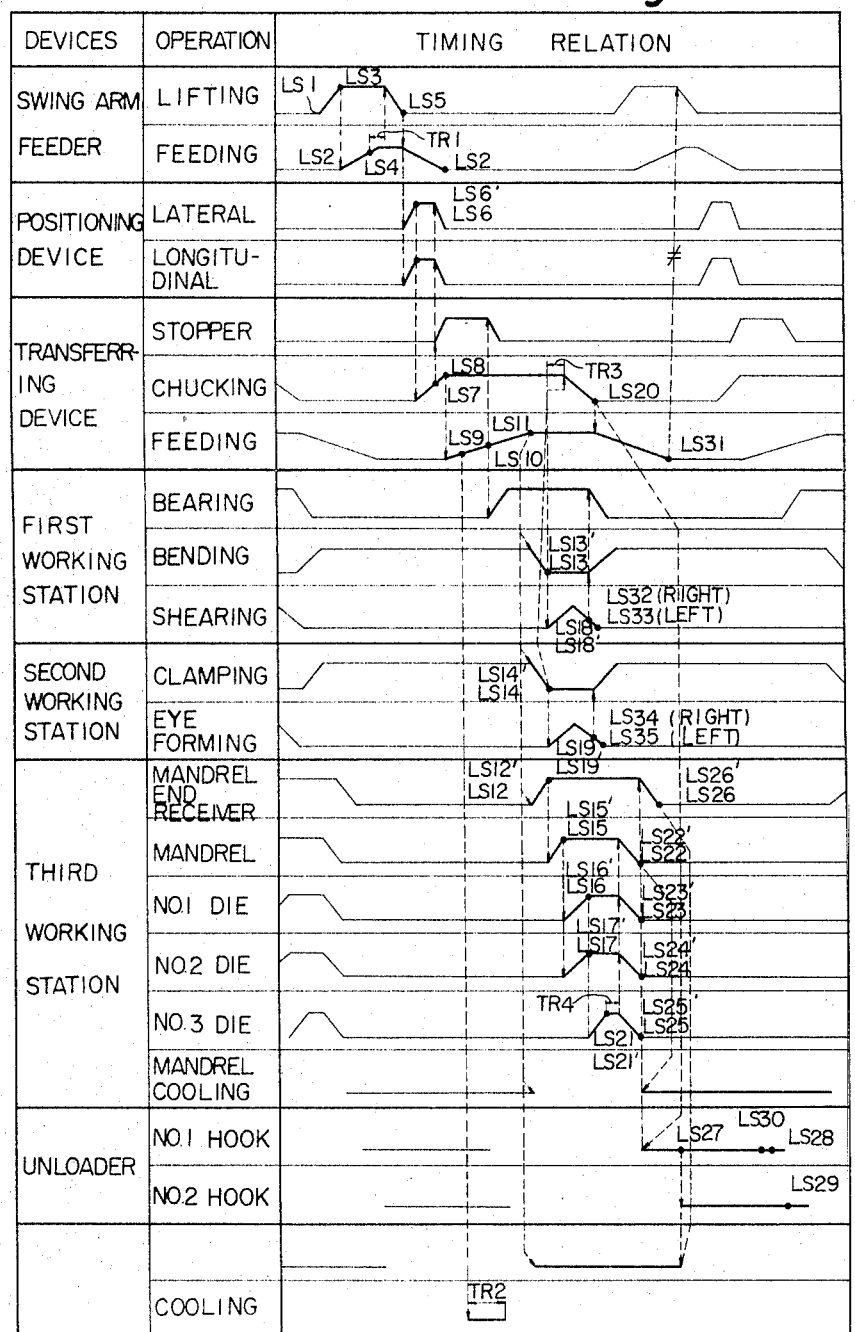
FIG. 10 is a timing graph of time relation between the devices or units.
Figure 11A:
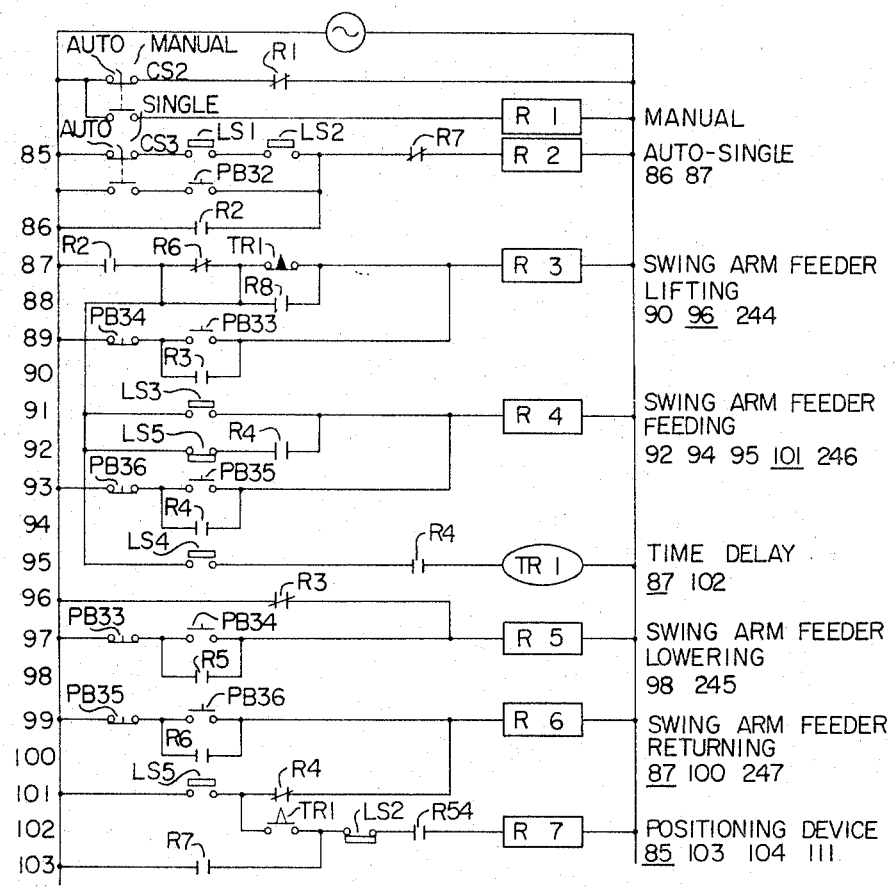
Figure 11B:
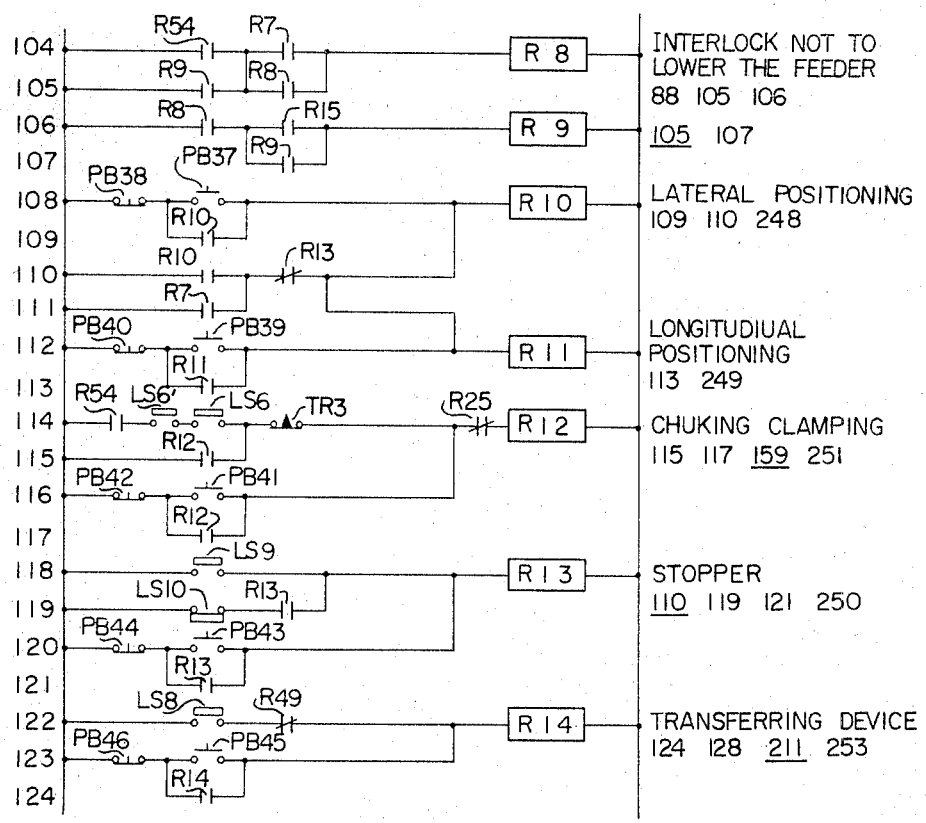
Figure 11C:
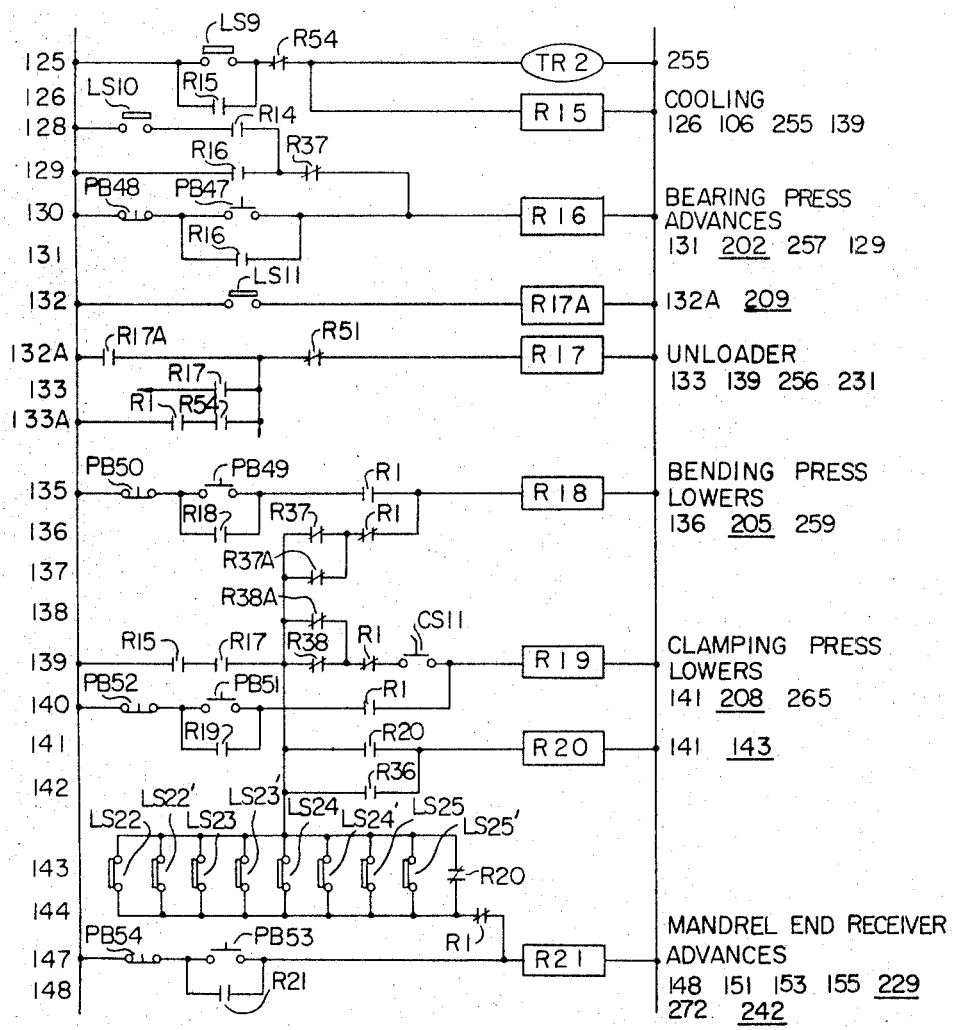
Figure 11D:
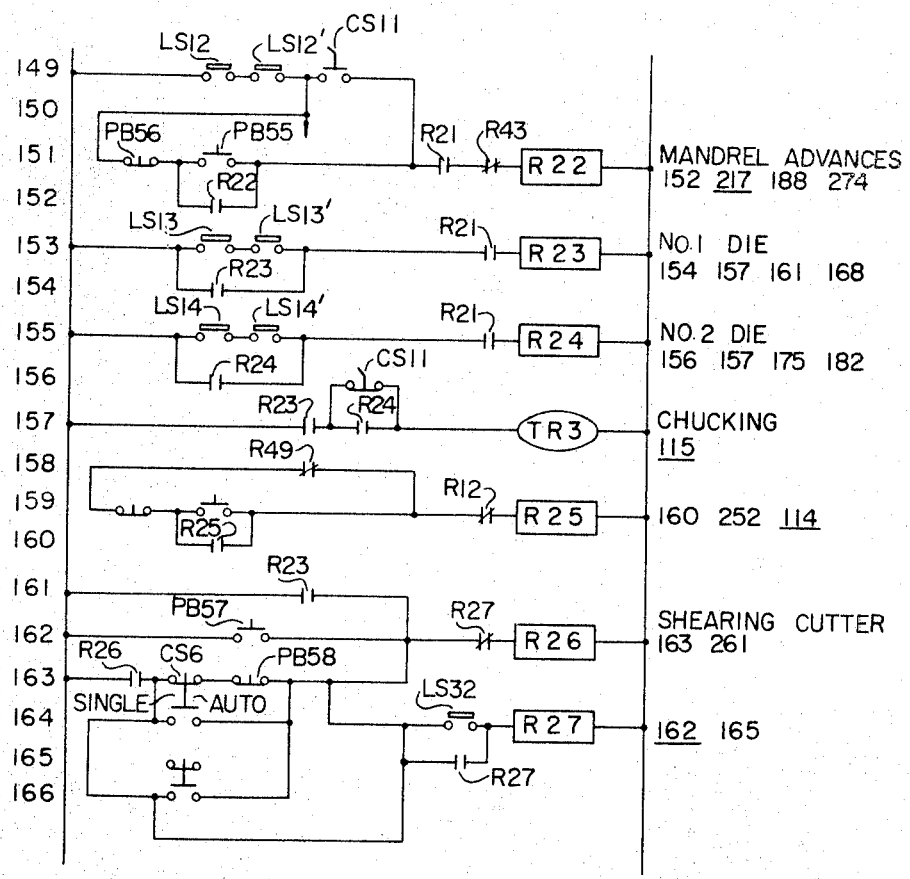
Figure 11E:
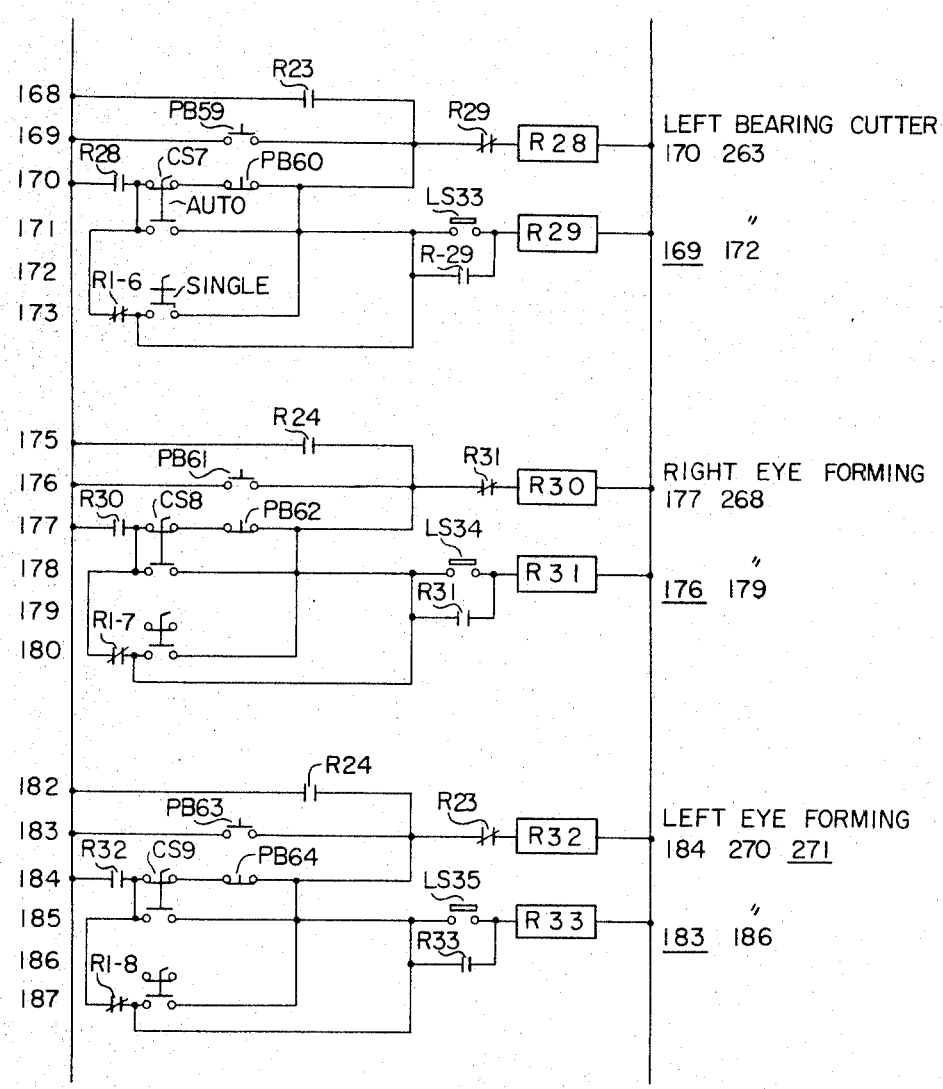
Figure 11F:
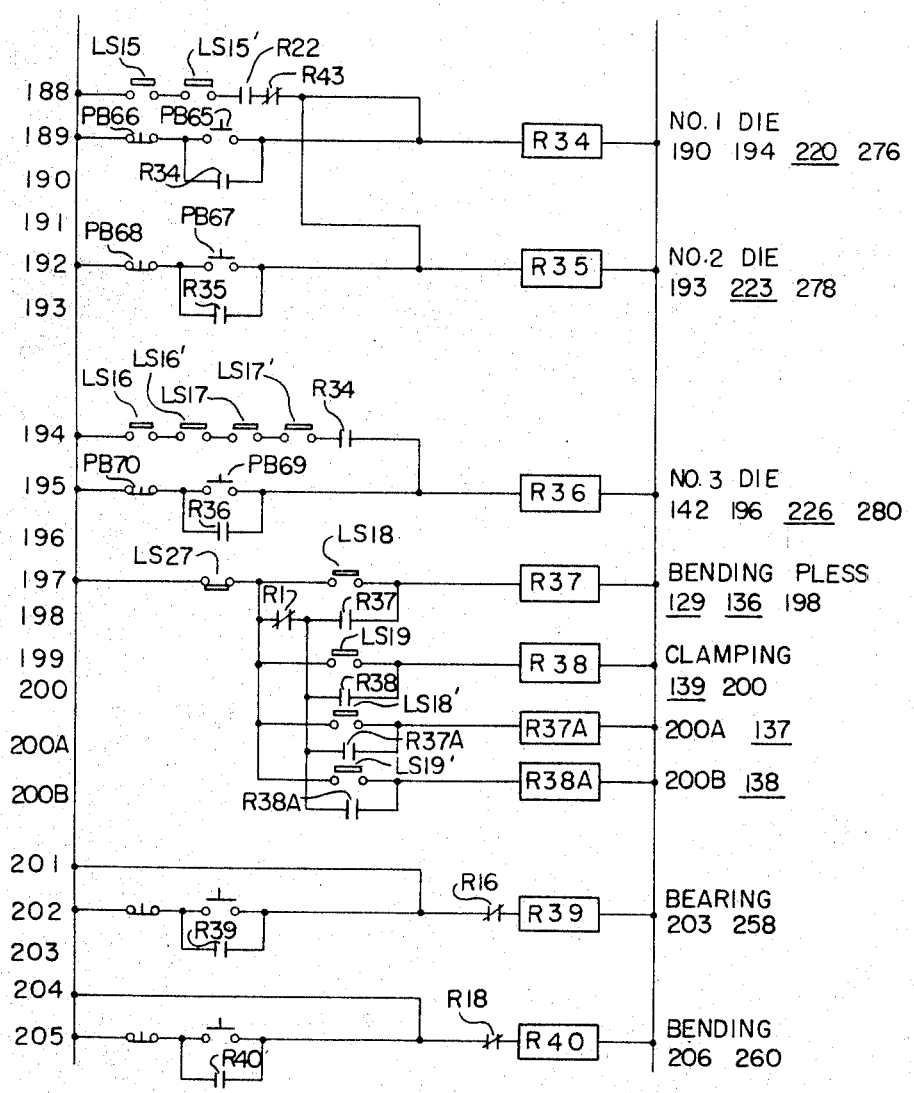
Figure 11H:
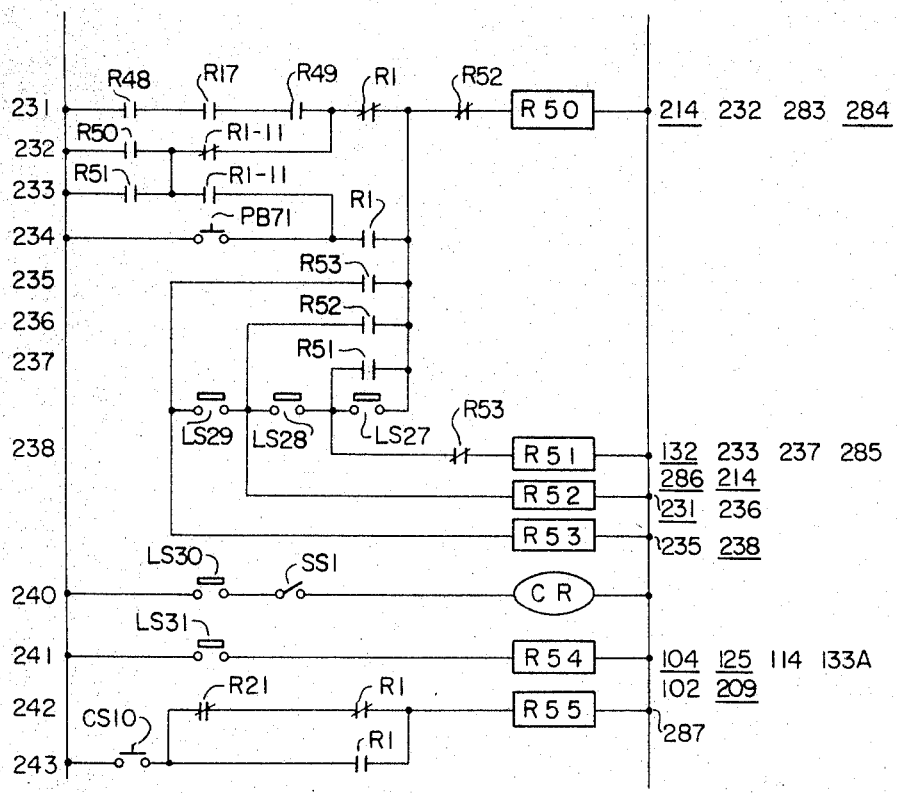
Figure 11J:
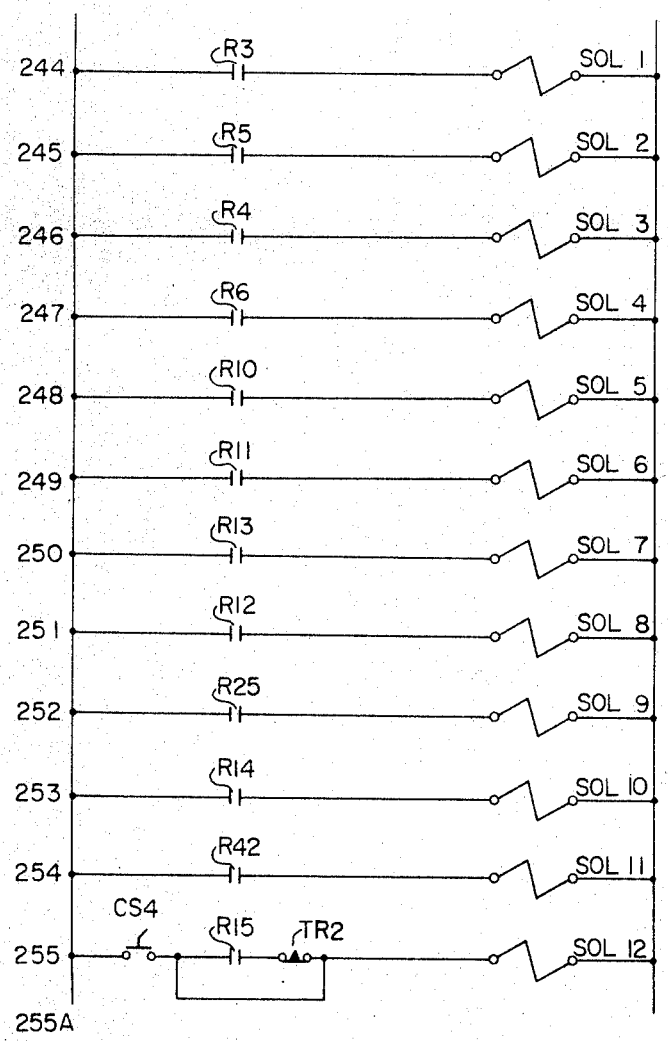
Figure 11K:
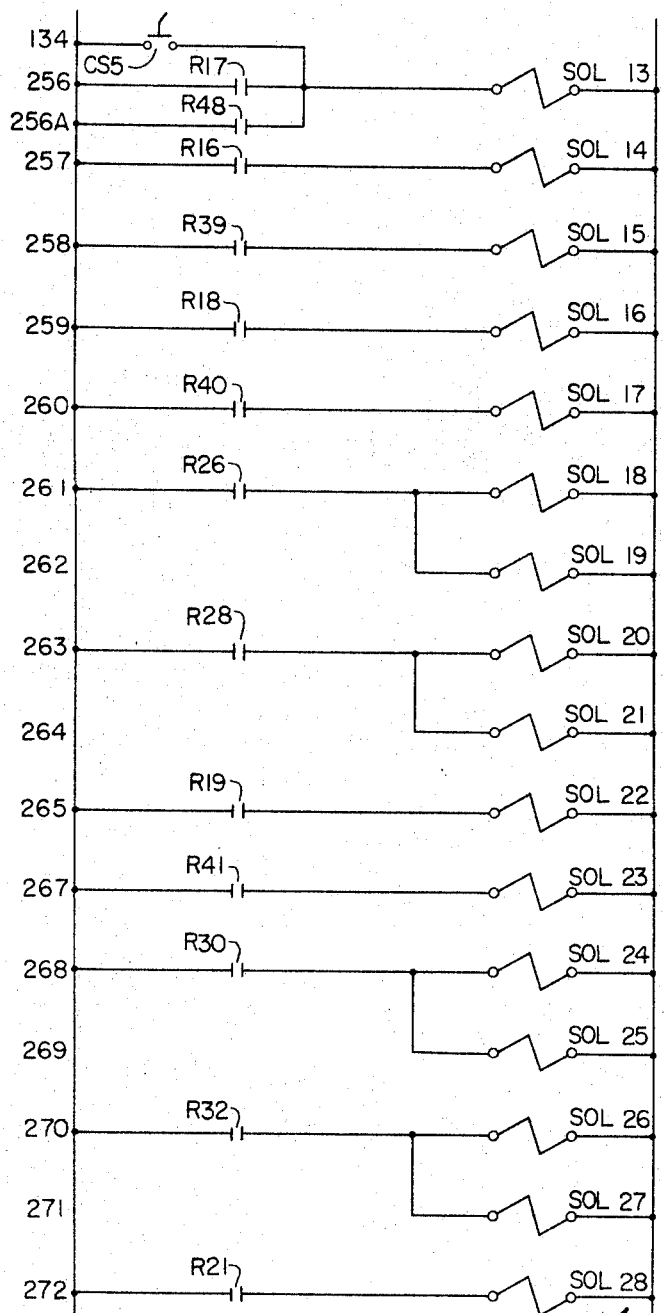
Figure 11L:
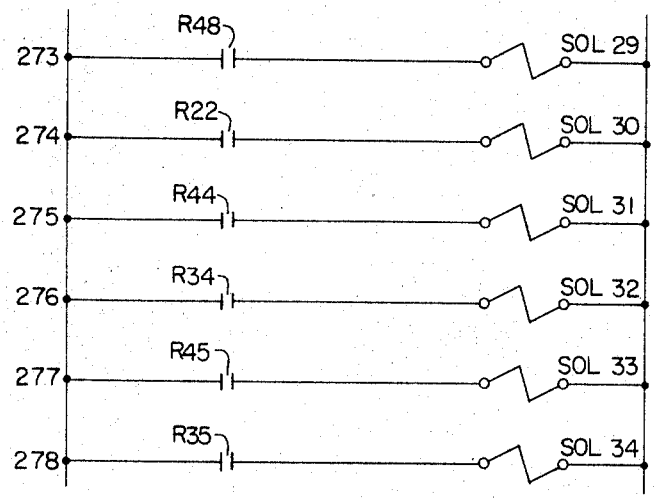
Figure 11M:
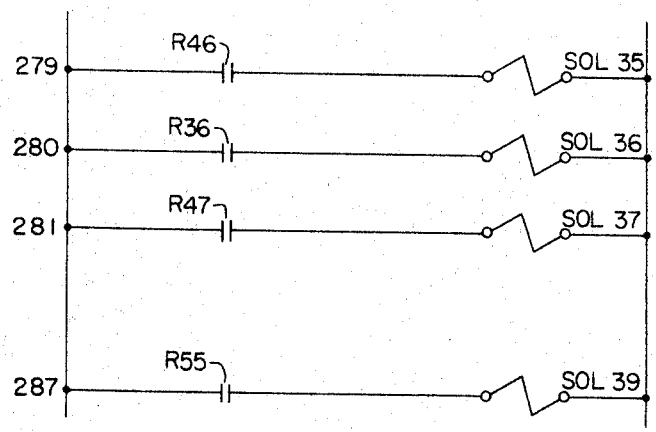

Although specific forms of the invention have been selected for illustration in the drawings, and the following description is drawn in specific terms for the purpose of describing those forms of the invention, this description is not intended to limit the scope of the invention, which is defined in the claims.

Referring now to the drawings, FIG. 1 shows an automatic eye forming machine in the form of block diagram as an embodiment of this invention including generally at least a leaf or strip material feeding conveyor 100 for carrying strip metal material to a shearing unit for cutting a predetermined length, a cutting press or shearing unit 200 for automatically cutting the strip metal material at a predetermined length so as to define the length of leaf spring for vehicles or the like, a conveyor device or first transferring device 300 for feeding the cut strip material into a punching unit for producing a center hole thereof for mounting overlapped leaf springs at, for example, the frames of vehicles or the like for supporting the body or wheel, a punching press or unit 400 for producing a center hole as aforesaid at the intermediate of the cut strip material, an unloader or second transferring device 500 for feeding the material into an end heating furnace for heating it at both ends so as to work easily and economically at the following working process, a first positioning device 600 for positioning the strip material longitudinally in alignment in the lengthwise direction so as to effect uniform end heating at the next heating furnace with the strip material being transferred advancedly to the crosswise direction, an end heating furnace 700 for heating both ends of the strip material uniformly so as to effect easy and economic working operation and trimming operation when the trimming is selectively required for the strip material at its opposite ends at the same time, a trimming press or unit 800, when selectively required, for trimming the strip material at both ends at the same time, a third transferring device 801 slidably mounted on the trimming press for feeding the strip material into an end reheating furnace, when trimmed, for heating again the strip material at opposite ends simultaneously, and end reheating furnace 900 for heating again both ends of the strip material so as to effect as described above at the next process in working operation, a swing arm feeder 1000 for feeding the end reheated strip material into a second positioning device so as to effect uniform products, a second positioning device 1100 for positioning the strip material in lateral and longitudinal directions so as to effect to produce uniform products in the next eye forming equipment, a first transferring slide 1200 for chucking the strip material at its center hole by the operations that at first a pin is being projected upwards into the center hole of the strip material and a chucking arm is being covered over the strip material so as to secure the strip material between the pin and the chucking arm for forming accurate eye at both ends thereof in next step, by sliding the transferring slide to a first working station, a first clamping device 1201 for clamping the chucked material at both sides of the center hole thereafter the first transferring slide initiating to return to its original position so as to transfer the following strip material as the same manner as before, a first working press 1300 for curling both ends at the same time of the strip material clamped by the clamping device into forming both ends thereof about half of a circle and an end shearing press or unit 1301 for cutting both top ends thereof at a predetermined length at the same time from the center hole at the first working station, a second transferring slide 1400 for chucking the strip material at its center hole by the same operation as the first transferring slide and for sliding the chucked material thereby it is fed into a second working station, a second clamping device 1401 for clamping the chucked strip material at both sides of the center hole thereafter the second transferring slide initiating to return to its original position so as to transform the following strip material, a second working press 1500 for forming eyes at both ends of the strip material by pressing the material inwards from the outside of the curled ends at the same time at the second working station, a third transferring slide 1600 for chucking the strip material at its center hole by the same operation as the first transferring slide and for sliding the chucked strip material thereby it is being slid into a third working station, a third clamping device 1601 for clamping the chucked strip material at both ends of the center hole thereafter the third transferring slide initiating to return to its original position so as to transfer the following strip material, a final eye forming device 1700 for forming finally accurate eye at both ends at the third working station comprising mandrels being inserted into both the eyes of the material, first, second and third slides of a third working press being pressed into both the peripheries of the eye configuration of the material at a predetermined order from the furthest slide from the end and interval of the pressing slides at both ends at the same time, then the mandrel being drawn from the both ends and the last transferring device for feeding out the material finally from the eye forming equipment.

Referring now to FIGS. 2A and 2B, one preferred embodiment of an automatic eye forming system for producing from strip metal material to complete leaf spring in accordance with this invention by way of side views is shown.

Strip metal material 1 is carried into a cutting press 200 by strip metal material feeding conveyor (not shown), and is cut into a predetermined length which may be adjustable depending upon the requirement for its final product. Then, the cut strip material is carried out from the cutting press 200 by lift conveyor 301 into a conveyor 302 and the strip material is transferred to a punching press 400 for producing a center hole thereof at the cut material. At the punching press 400 the strip material is punched to form a center hole after the strip material is transferred into the sizing device on the punching press 400 with the material being determined by the position of the center hole. After the center hole is formed at the intermediate of the strip material at the punching press, the strip material is carried out from the press 400 by an unloader 500 into next station. The material 1 is transferred into next and at its end it falls down. When the material falls down to operate the feeder for pushing the material forward. Thereafter, the transferring device or first positioning device 600 operates to lift it upward and feed it forwards. And the material is fed into the end heating furnace 700 which is fed in the furnace by means of such as belt conveyor so as to heat only at both ends of the material so as to easily work forming. When the material is end heated and fed to the end of the furnace, it is transferred into quick feeder which is operated by means of air cylinder or motor so as to transfer the material quickly to the next working station.

From the quick feeder, the material is lifted upwards therewith transferring slide and is advanced forwards into the trimming unit 800 in which the material is trimmed at both ends when required. Then, it is transferred into an end reheating furnace 900 by means of transferring device 801. When the material arrives at the end of the reheating furnace 900, the material falls on the top of the swing arm feeder 1000, and transferred into second positioning device 1100 in which the material is accurately positioned at its lateral and longitudinal position. Then the material is fed into the eye forming equipment so as to form accurate eye at both ends, which will be hereinafter described in detail.

In FIGS. 3A through 3D, in which elevational side views of embodiments of this invention, transferring slide 1200 for chucking the strip material in operation by the steps of start, first medium, second medium and chucking of the automatic eye forming machine are shown.

This transferring slide such as in case of the slide 1200 (all three transferring slides 1200, 1400 and 1600 are the same structure, accordingly only one will be hereinafter explained) comprises a slidable casing 1201, an arm 1202 pivotally secured to shaft 1203, a chucking arm 1204 integrally secured to the arm 1202 and being rotatable at the pivot or shaft 1203 for chucking the strip material 1 swinging over the material, a rack 1205 for contacting to a hydraulic cylinder with linkage (not shown) and for driving pinion 1206 so as to push the arm 1202 for chucking the strip material 1, cam 1207 for raising through cam roller 1209 center pin 1210 so as to insert into the center hole of the material to fix it from the bottom, rocker arm 1211 for transmitting the elevational motion of the cam to the center pin from the bottom positioned in a center pin holder 1212, link 1213 disposed between the center pin and the rocker arm so as to transmit the force therebetween, a connecting rod 1214 for defining the motion of the chucking arm with spring 1215, and levers 1216, for driving arm 1202.

In operation of the transferring slide, when the rack 1205 is pushed leftward to drive pinion 1206 with lever 1216 which push the lower end of the arm to drive it and the chucking arm initiate to stand up and advances further to over the material disposed thereon. When the rack advances further together with the cam 1207 and lower cam roller to push down the left end of the rocker arm 1211 inversely push upward opposite end to raise through the link 1213 center pin into the center hole of the material, in order to chuck the material from both sides.

Referring now to FIGS. 4A through 4C and 5A through 5C, at the first working station, when the material 1 is transferred, in considering with one end of the material after the material is chucked at the first station, bearing press 1302 advances to predetermined position to bear when the end thereof is curled from oppoiste side and thereafter the bending press 1303 lower so as to press from the above the material to curl, and after curled the cutter 1304 of the shearing unit advances to cut the end of the material. Then the material is transferred to the second working station. Then the curled end is pressed by the eye forming press 1501 after the material is clamped by clamping press 1502 together with support 1503, and the curled end is formed into the eye formed shape. Thereafter, the material is fed into the third working station, first the mandrel 1701 advances to insert into the eye formed hole which is accurately formed at the periphery for circular shape. Then, the mandrel end receiver advances to be inserted by the top end of the mandrel when advanced. Thereafter, No. 1, 1703, 1704 and 2 dies operate to press at the periphery of the eye formed end from the farthest end from the top end of the mandrel. Then No. 3 1705 die advances to finally form the accurate eye shape at the eye formed end of the material. After formed accurate eye forming hole at the end, all three dies 1703 to 1705 returns at the same time together with the mandrel and the mandrel end receiver.

In FIGS. 6 and 7A through 7D, the strip material 1 is fed to the cutting press 200 by conveying means such as, for example, roller conveyor or strip material feeding conveyor 100 from the stocks by means of manual or automatic means and the material 1 is stopped by a leading edge stopper 201 at the position where the leading edge of the material 1 may be cut accurately, and the leading edge is cut. Then, the leading edge stopper raise and the strip material 1 is inserted until the material 1 reaches an end stopper 202 at the leading end of the material 1. The end stopper 202 may be adjustable in response to the length required of the material 1 to be set. When the strip material 1 is fed into the cutting press, just before one cycle is finished in cranking since the press is operated by the cranking operation, limit switch LS1 operates to fall the material which is cut at the cutting press into the roll conveyor 203 through solenoid switch. Thereafter, limit switch LS2 operates to stop the cutting press. When the limit switch LS1 is operated, after a predetermined time limit switch LS18 operates to energize time delay relay 2X–1 and after a predetermined time the time delay relay operates to deenergize the relay 88X–4 to operate the cutting press again.

When the cut material 1 reaches lift conveyor 204, it is lifted into punching press. On the way for the material 1 to be fed into the punching press, limit switch LS3 or 4 operates for either long or short material to operate feeder 401 to push the material into fully for punching. This punching press may punch a circular or elliptic on the center of the material. When the material is fed into fully its position for punching in the press, limit switch LS5 operates, and after a predetermined time delay first positioning device 600 for positioning the material at the punching press 400 such as positioning it by guide roller so as to dispose the material beside the center to pivot correctly. After positioning, limit switch 6 operates to operate the punching press 400 by cranking. When the material is punched, on its way punching, limit switch LS7 operates to return the positioning device, at the same time the material is taking out by unloader or second transferring device 500, and limit switch LS8 also operates to disengage the clutch of the punching press so as not to operate. When the unloader operates just before one cycle of its cranking operation, limit switch LS9 operates to disengage the clutch of the unloader 500.

The material 1 is transferred into next station by the unloader, at its end it falls down. When the material falls down, limit switch x operates to confirm the entrance of the material, and also operates the feeder for punching the material forward, and limit switch LS11 operates to transferring device or first positioning device 600 to lift it upward and at its uppermost position limit switch LS14 operates to move it rightward in the drawings. On its way at a predetermined time, limit switch LS15 operates, to feed the transferring device 600, and after a predetermined time delay the transferring device 600 returns downwards to its original position in which limit switch LS16 operates to return the transferring device to its original position. At the end of the positioning device which operates only longitudinal set of the material, limit switch LS12 operates, and after a predetermined time delay it returns to its original position after it puts the material at the end of end heating furnace 700.

The material is fed in the furnace 700 by means of such as belt conveyor so as to heat only at both ends of the material so as to easily work forming. When the material is end heated and fed to the end of the furnace, it is transferred into quick feeder which is operated by means of air cylinder or motor so as to transfer the material quickly to the next working station. This quick feeder is the same as the transferring mechanism of the trimming unit, which will be hereinafter described.

In FIGS. 8 and 9A through 9D, when the quick feeder operates, limit switch LS1 operates after it receives the material therefrom to lift transferring slide. At the uppermost position thereof limit switch LS2 operates, and after a predetermined time delay the transferring slide is fed forwards, and at its forward end limit switch LS3 operates, and after a predetermined time delay the transferring slide is lowered downwards, and at its lowermost end limit switch LS4 operates to return the slide back, and when fully returned limit switch LS11 operates to repeat this step again. On the way for the transferring slide to advance forwards limit switch LS12 operates to cool the die of the trimming unit for a predetermined time.

When the limit switch LS4 operates to operate positioning device so as to position longitudinally the material to advance from both sides. Thereafter, limit switch LS5 operates to press the material at both ends by the trimming unit. Just before the trimming press is finished by cranking operation limit switches LS8 and 9 operate to initiate to return the positioning device. Thereafter, limit switch LS10 operates to repeat this step again.

In FIGS. 10 and 11A through 11F, when the material 1 arrives at the end of the reheating furnace 900, the strip material 1 falls on the top of the swing arm feeder 1000, and limit switch LS1 (85) closes. Since limit switch LS2 (85) has closed in the afore-cycle when the swing arm feeder 1000 returned after it transferred the material 1 into the second positioning device 1100, if a double through switch DS3 is thrown to interlock side from one step side, which switch has a function to switch the operation of this machine either interlock or single feeding operation, relay R2 is energized, which relay has its contact in lines 86 and 87 both of which are normally open contacts, both of which contacts closes. When the contacts R2 (87) closes, relay R3 is energized through a normally closed contact R6, and the contact of normally closed time delay relay TR1. When the relay R3 is energized, the normally open contact 90 closes, the normally closed contact 96 opens, and the normally open contact 244 closes to operate solenoid relay SOL1 to open hydraulic valve (not shown) to flow hydraulic pressure to swing arm feeder 1000 piston to lift itself. When the swing arm feeder 1000 lifts at a predetermined level, limit switch LS3 operates to close its normally open contact 91 to energize relay R4 from the mid-point between R2 and R6 or R6 and TR1 (87) so as to close normally open contact 92, 94, 95 and 246, and open normally closed contact 101. When the contact 92 closes, relay R4 is energized also through limit switch LS5. When the contact 246 closes, solenoid relay SOL3 operates to open hydraulic valve (not shown) to flow hydraulic pressure to swing arm feeder 1000 piston to feed itself forwards to feed the material 1 thereon to advance it into the second positioning device 1100. On the way for the swing arm feeder 1000 to advance toward the positioning device 1100 at a predetermined position just before it reaches the second positioning device 1100, limit switch LS4 operates to close its normally open contact 95 to energize time delay relay TR1. When the time delay relay is energized, after a predetermined time since the relay TR1 is energized, it operates to open normally closed contact TR1 (87) to deenergize relay R3 to stop to lift the swing arm feeder 1000, and to close normally open contact TR1 (102). When the relay R3 is deenergized, the normally closed contact 96, once operated and opened, closes again to energize relay R5. When the relay R5 is energized, normally open contact 98 closes to interlock itself and normally open contact 245 closes to energize solenoid relay SOL2 to open solenoid valve (not shown) to flow hydraulic pressure to swing arm feeder 1000 piston to lower it and put the material 1 thereon on the positioning device 1100. After a predetermined time since the swing arm feeder 1000 lowers, limit switch LS5 operates to open normally closed contact LS5 (92) to deenergize relay R4 to stop to advance the swing arm feeder 1000 since the limit switch LS3 opens at a predetermined level on the way lowering. At the same time the normally open contact LS5 (101) closes to energize through the contact R4, now closed, relay R6. When the relay R6 is energized, normally closed contact 87 opens to deenergize the relay R3 to confirm to stop to lift the swing arm feeder 1000, normally open contact 100 to interlock thte relay R6 and normally open contact 247 closes to energize solenoid relay SOL4 to open solenoid valve (not shown) to apply the hydraulic pressure to the swing arm feeder 1000 piston to return it, and operate limit switch LS2 to open its contact 85 and to close contact 102. Since the normally open contact R54 (102) is closed after the material is handled in the eye forming equipment or one cycle is operated, while the normally open contact TR1 is energized to close as described before, relay R7 is energized. When the relay R7 is energized, normally closed contact 85 opens to deenergize the relay R2 to interlock itself by normally open contact 86 and to deenergize the relay R3 to stop to lift the swing arm feeder 1000 and so on the same as above-mentioned to continue to operate. And also, normally open contact (103) closes to interlock itself, normally open contact (104) closes to energize relay R8. When the relay R8 is energized, normally open contact 88 closes to short circuit the TR1 contact 87 so as not to deenergize the relay R3 or so as not to stop to lift the swing arm feeder 1000 in other wards interlocking not to lower the feeder 1000. And also the relay R8 interlocks itself by normally open contact 105, and closes normally open contact 106, which will be hereinafter described. When the relay R7 is energized, normally open contact 111 closes to energize relays 10 and 11 both to interlock itself and also energize normally open contacts 248, 249 to energize solenoid relays SOL5 and 6 to open solenoid valves to apply air pressure to respective lateral and longitudinal positioning devices so as to determine the position of the material 1 on the positioning devices. When the lateral and longitudinal positioning devices operate, limit switches LS6 and 6' operate to close its normally open contacts 114 to energize relay 12 through contact R54 which is closed after one cycle is operated in the eye forming equipment and normally closed time delay relay contact TR3 and normally closed contact R25 which will be hereinafter described. When the relay R12 is energized, normally open contact 115, 117 closes to interlock itself, and also normally closes contact 159 opens to deenergize relay R25 which will be hereinafter described and normally open contact 251 closes to energize solenoid relay SOL8 to open solenoid valve (not shown) to flow hydraulic pressure to first transfer slide 1200 so as to operate chucking the material 1. On the way for the rack 1205 to advance and for the chucking arm 1204 to raise over the slide, limit switch LS7 operates to close its normally open contact 118 to energize relay R13 first to open normally closed contact 110 to deenergize the relays R10 and 11 to deenergize the lateral and longitudinal positioning devices, second to close normally open contact 119 to interlock itself, third to close normally open contact 121 also to interlock itself, and the fourth to close normally open contact 250 to energize solenoid relay 7 to open solenoid valve (not shown) to flow air pressure to the material clamper so as to clamp the material 1 at both sides of its center.

When the chucking arm reaches over the material to chuck it, limit switch LS8 operates to energize through normally closed contact 122 relay R14. When the relay R14 is energized, first normally open contact 124 closes to interlock itself, second normally open contact 128 closes which will be hereinafter described, third normally closed contact 211 opens which will be hereinafter described, and the fourth normally open contact 253 closes to energize solenoid relay SOL10 to open solenoid valve (not shown) to apply air pressure to the feeding device for the first transferring slide 1200 so as to quickly feed to the first working station as the material 1 is clamped by the material clamper 1208.

On the way for the first transferring slide to feed quickly, limit switch LS9 operates to close its normally open contact 125 to energize both relay R15 and time delay relay TR2. When the relay R15 is energized, first normally open contact 126 closes to interlock itself, second normally open contact 106 closes to energize relay R9 to open normally closed contact 105 in which state after one cycle is finished the relay R8 is deenergized to release interlock not to lower the feeder, and to close normally open contact 107 to interlock itself, third normally open contact 255 closes to energize through manual switch CS4 when thrown in so as to intend to cooling operation and normally closed contact of time delay relay TR2 solenoid relay SOL12 to open solenoid valve (not shown) to apply cooling water to dies for prevent wear thereof so as to keep accurate products, and the fourth normally open contact 139 closes which will be hereinafter described. When the time delay relay TR2 is energized the normally closed contact 255 will open after a predetermined time to deenergize the solenoid relay SOL12 to stop cooling the dies.

On the way for the first transferring slide to feed forwards, limit switch LS10 operates to open its normally closed contact 119, to deenergize the relay R13 when the first transferring slide returns and on its way back for the limit switch LS7 to open again. And also, normally open contact LS10 closes to energize relay R16 through normally open contact R14, now closed and normally closed contact R37 (129). When the relay R16 is energized, first normally open contact 129 closes to interlock itself, second normally open contact 131 closes to also interlock itself, third normally open contact 257 closes to energize solenoid relay SOL14 to open solenoid valve (not shown) to apply hydraulic pressure to a bearing press so as to bear when the end of material is curled at the opposite side at the first working station, and the fourth normally closed contact 202 opens to deenergize relay R39 to stop the return of the bearing press which will be hereinafter described in detail.

When the bearing press reaches predetermined advance, limit switch LS11 operates to close its normally open contact 132 to energize relay R17A. When the relay R17A is energized, normally open contact 132A closes to energize through normally closed contact R51 (132A) relay R17 and normally closed contact 209 opens which will be hereinafter described. When the relay R17 is energized, first normally open contact 133 closes to interlock itself, second normally open contact 139 closes to energize through normally closed contacts R37 (136) or R37A (137) and R1 (136) relay R18 and to energize through normally closed contacts R38A (138) or R38 (139) and R1 (139) and manual switch CS11 which is set closed so as to operate eye forming at the second working station, relay R19, third normally open contact 256 closes to energized solenoid relay SOL13 to switch unloader motor ON so as to unload the eye formed material or leaf spring from the third working station, and the fourth normally open contact 231 closes which will be hereinafter described.

When the relay R18 is energized, first normally open contact 136 closes to interlock itself through normally open contact R1 (135), now closed, second normally open contact 259 closes to energize solenoid relay SOL16 to open solenoid valve (not shown) to apply hydraulic pressure to bending press to lower it so as to curl the ends of the material 1 at the first working station, and the third normally closed contact 205 opens to deenergize relay R40 to stop the return of the bending press upwards at the first working station.

When the relay R19 is energized, first normally open contact 141 closes through normally open contact R1 (140), now closed, to interlock itself, second normally open contact 265 closes to energize solenoid relay SOL22 to open solenoid valve (not shown) to apply hydraulic pressure to clamping press to lower it so as to fix the material at the second working station, and the third normally closed contact 208 opens to deenergize relay R41 to stop the return or raise of the eye forming press at the second working station.

At the end of operation of the bending press, limit switches LS13 and 13' operate at respective ends of the material 1 to close its normally open contacts through normally open contact R21 (153) which is closed since the relay R21 is energized through either limit switches LS22 or 22', LS23 or 23', LS24 or 24', LS25 or 25' or normally closed contact R20 (143) and normally closed contact R1 (144). Incidentally, when the relay R21 is energized, first normally open contact 148 closes to interlock itself, second normally open contact 151 closes which will be hereinafter described; third normally open contact 153, 155 closes, third normally closed contact 229 opens which will be hereinafter described, fourth, normally open contact 272 closes to energize solenoid relay SOL28 to open solenoid valve (not shown) to apply hydraulic pressure to the mandrel end receiver so as to insert the mandrel therein through the eye formed at the end of the material 1 at the third working station, and the fifth normally closed contact 242 opens to deenergize relay R55 so as to stop the cooling of the mandrel. When the relay R23 is energized, first normally open contact 154 closes to interlock itself, second normally open contact 157 closes which will be hereinafter described, third normally open contact 161 closes to energize relay R26, and the fourth normally open contact 168 closes to energize relay R28. When the relay R26 is energized, first normally open contact 163 closes to interlock itself, second normally open contact 261 closes to energize solenoid relays SOL18 and 19 to open solenoid valves (not shown) to apply hydraulic pressure so as to disconnect right clutch and brake to operate right shearing cutter to advance it so as to cut the end of the material 1. When the relay R28 is energized through normally closed contact R29 (169), first normally open contact 170 closes through manual switch CS7 which is contacted at line 170 when it is set to operate automatic, second normally open contact 263 closes to energize solenoid relays SOL20 and 21 to open solenoid valves (not shown) to apply hydraulic pressure so as to disconnect left clutch and brake to operate left shearing cutter to advance it so as to cut the end of the material 1.

At the end of operation of the clamping press, limit switches LS14 and 14' operate at respective ends of the material 1 to close its normally open contacts through normally open contact R21 (155) which is closed since the relay R21 is energized through either limit switches LS22 or 22′, LS 23 or 23′, LS24 or 24′, LS25 or 25′ or normally closed contact R20 (143) and normally closed contact R1 (144), the same as aforementioned. When the relay R24 is energized, first normally open contact 156 closes to interlock itself, second normally open contact 157 closes through normally open contact R23 which is hereinbefore described, now closed, to energize time delay relay TR3. When the time delay relay TR3 is energized, after a predetermined time normally closed contact TR3 (115) opens to deenergize relay R12 so as to disconnect the chucking arm from the material 1. Third normally open contacts 175, 182 closes to energize relays 10 and 12 to advance No. 2 right and left eye forming presses.

At the beginning of operation of the mandrel end receiver to insert the end of the mandrel, limit switchs LS12 and 12′ operate at respective ends of the material 1 to close its normally open contacts 149 through manual switch CS11 which is closed when it is set to operate at automatic position and normally open contact R21, now closed, and normally closed contact R43 (151) to energize relay R22. When the relay R22 is energized, first its normally open contact closes to interlock itself, second normally closed contact 217 opens to deenergize relay R44 to return back mandrel which will be hereinafter described, third normally open contact 188 closes which will be hereinafter described, and the fourth normally open contact 274 closes to energize solenoid relay SOL30 to open solenoid valve (not shown) to apply hydraulic pressure to the mandrel so as to return it back.

The cutter of the shearing unit is operating by cranking action, and at the first working station just before one cycle is finished to cut the end of the material 1, limit switches LS18 and 18′ operate to close its normally open contacts to energize through normally closed contact 197 of limit switch LS27 relays R37 and 37A. When the relay R37 is energized, first normally closed contact 129 opens to deenergize relay R16 to stop advancing the bearing press, second normally closed contact 136 opens to deenergize relay R18 to stop lowering the bending press, and the third normally open contact 196 closes to interlock itself. When the relay R37A is energized, normally open contact 200A closes to interlock itself, and normally closed contact 137 opens to deenergize relay R18.

At the end of the above cranking operation, limit switches LS32 and 33 are operated. When limit switch LS32 operates to close its normally open contact 164 to energize relay R27, first normally open contact 165 closes to interlock itself, and the second normally closed contact 162 opens to deenergize the relay R26 so as to stop advancing the right shearing cutter. When the limit switch LS33 operates to close its normally open contact 171 to energize relay R29, first normally open contact 172 closes to interlock itself, and the second normally closed contact 169 opens to deenergize the relay R28 so as to stop advancing left shearing cutter.

At the second working station, eye forming press is operating by cranking action, and just before one cycle is finished to press the curled end of the material 1 into eye formed end, limit switches LS19 and 19′ operate to close its normally open contacts to energize through normally closed contact 197 of limit switch LS27 relays R38 and 38A. When the relay R38 is energized, first normally closed contact 139 opens to deenergize relay R19 to stop lowering the clamping press, second normally open contact 200 closes to interlock itself. When the relay R38A is energized, normally open contact 200B closes to interlock itself, and normally closed contact 138 opens to deenergize relay R19.

At the end of the above cranking operation, limit switches LS34 and 35 are operated. When limit switch LS34 operates to close its normally open contact 178 to energize relay R31 through normally open contact R30 which is closed when the relay R30 is operated, and manual switch CS8 which is closed at line 177 when it is set to automatic position. Incidentally, when the relay R30 is energized, besides the normally open contact 177 closes, normally open contact closes to energize solenoid relays SOL24 and 25 to open solenoid valves (not shown) to disconnect clutch and brake to operate to advance right eye forming press so as to make the curled end of the material 1 into eye formed end. When the relay R31 is energized, first normally closed contact 176 opens to deenergize the relay R30 to stop advancing the eye forming press, and the second normally open contact 179 closes to interlock itself.

When the limit switch LS35 operates to close its normally open contacts 185 to energize relay R33 through normally open contact R32 which is closed when the relay R32 is operated, and manual switch CS9 which is closed at line 184 when it is set to automatic position. Incidentally, when the relay R32 is energized, besides the normally open contact 184 closes, normally open contact closes to energize solenoid relays SOL26 and 27 to open solenoid valves (not shown) to disconnect clutch and brake to operate to advance left eye forming press so as to make the curled end of the material 1 into eye formed end. When the relay R33 is energized, first normally closed contact 183 opens to deenergize the relay R32 to stop advancing the eye forming press, and the second normally open contact 186 closes to interlock itself.

At the third working station, when the mandrel initate to advance so as to insert into the eye hole of the end of the material 1, limit switches 15 and 15′ operate to close its normally open contacts 188 to energize relays R34 and 35 through the normally open contact R22, now closed and normally closed contact R43 (188). When the relay R34 is energized, first normally open contact 190 closes to interlock itself, second normally open contact 194 closes which will be hereinafter described, third normally closed contact 220 to deenergize relay R45 so as to stop returning No. 1 die, and the fourth normally open relay 276 to energize solenoid relay SOL32 to open solenoid valve (not shown) to apply hydraulic pressure to No. 1 die to press the periphery of the end of the material. When the relay R35 is energized, first normally open contact 193 closes to interlock itself, second normally closed contact 223 opens to stop returning No. 2 die. and the third normally open contact 278 closes to energize solenoid relay SOL34 to open solenoid valve (not shown) to apply hydraulic pressure to No. 2 die so as to press the periphery of the end of the eye formed of the material 1.

After the Nos. 1 and 2 dies operate to advance so as to press the end eye formed periphery of the material 1, simultaneously limit switches LS16 and 16′ at No. 1 die and LS17 and 17′ at No. 2 die at both ends, operate to energize relay R36 through serial reach normally open contact 194 closed and normally open contact R34, now closed. When the relay R36 is energized, first normally open contact 142 closes to energize relay R20 to disconnect its normally closed contact 143 and when limit switch LS22 through 25′ is open to deenergize the relay R21 to stop advancing the mandrel end receiver, second normally open contact 196 closes to interlock itself, third normally closed contact 226 opens to deenergize relay R47 to stop returning No. 3 die, and the fourth normally open contact 280 closes to energize solenoid relay SOL36 to open solenoid valve (not shown) to apply hydraulic pressure to No. 3 die to press the periphery of the eye formed end of the material 1.

When the relay R39 is energized, its normally open contact 203 closes to interlock itself, and normally open contact 258 closes to energize solenoid relay SOL15 to operate to return back the bearing press. When the relay R40 is energized, interlocks itself and normally open contact 260 closes to energize solenoid relay SOL17 to operate to return upwards the bending press. When the relay R41 is energized, also interlocks iself and normally open contact 267 closes to operate through solenoid SOL23 to return upwards the clamping press. When the relay R42 is energized, also interlocks itself and normally open contact 254 closes to operate through solenoid SOL11 to return respective transferring slides. When the relay R44 is energized, also interlocks itself and normally open contact 275 closes to operate through solenoid relay 31 to return back the mandrel. When the relay 45 is energized, also interlocks itself and normally open contact 277 closes to operate through solenoid relay SOL33 to return back the No. 1 die. When the relay R46 is energized, also interlocks itself and normally open contact 279 closes to operate through solenoid relay SOL35 to return back No. 2 die. When the relay R47 is energized, also interlocks itself and normally open contact 281 closes to operate through solenoid relay SOL37 to return No. 3 die.

When the No. 3 die operates, limit switches 21 and 21' operate to close its normally open contacts to energize time delay relay TR4 through normally closed contact R1 (213). When the time delay relay TR4 is energized, after a predetermined time its normally open contact 214 closes to energize relay R43 through normally closed contact R51 (214). When the relay R43 is energized, normally closed contact 151 opens to deenergize the relay R22 to stop advancing mandrel, normally closed contact 188 to deenergize the relay R34 to stop pressing of No. 1 die, and normally open contact closes to interlock itself.

When the mandrel returns, limit switches LS22 and 22' operate. When the No. 1 die returns, limit switches LS23 and 23' operate. When the No. 2 die returns, limit switches LS24 and 24' operate. When the No. 3 die returns, limit switches LS25 and 25' operate. When the respective transferring slides returns, limit switch 20 operates. Either limit switch 22 through 25' operate, its normally closed contacts 143 open to deenergize the relay R21 to stop advancing mandrel end receiver and also all normally open contacts 22 through 25' 228 operates to close to energize relay R48 through the normally closed contact R21 (229). When the relay R48 is energized, its normally open contact closes to operate solenoid relay SOL29 to return the mandrel end receiver, normally open contact 256A closes to energize solenoid relay SOL13 to operate unloader, and normally open contact 231 closes to energize relay R50 through normally open contact R17 and 49 and normally closed contact R1 and 52. When the relay R49 is energized normally, closed contact 122 opens to deenergize the relay R14 to stop advancing the transferring slides, normally closed contact 158 opens to deenergize the relay R25 to stop the operation of stopping of the chucking, normally open contact 231 closes to energize the relay R50 to operate No. 1 hook so as to unload the eye formed material, normally open contact 211 to energize the relay R42 to return the transferring slides, and the normally open contact 210 also the same.

What is claimed is:

1. A method of automatically producing leaf springs having eyes at both ends thereof comprising the steps of cutting strip metal material by a shearing unit to a predetermined length, feeding the cut material into a punching unit, punching the material so as to form a center hole therein, feeding the material into an end heating furnace for heating both ends, feeding the end heated material into a positioning device for positioning the material in the lateral and longitudinal directions, chucking the material at its center hole, sliding the chucked material into a first working station, clamping the chucked material on both sides of the center, unchucking the material, curling both ends of the material, cutting both ends at a predetermined length from the center, chucking the material again and sliding it into a next station, clamping the chucked material on both sides of the center hole, unchucking the material, forming eyes at both ends of the material by pressing the curled material inwards from the outside thereof, chucking the material at its center hole, sliding the chucked material into a third working station, clamping the chucked material on both sides of the center, unchucking the material, forming an accurately shaped eye at both ends of the material by the steps of moving on mandrel end receivers close to the material, inserting mandrels into both the eyes of the material and into the end receivers, and then pressing the material by first and second dies and then by third dies around the peripheries of the eyes of the material at predetermined intervals, and then withdrawing said mandrels from the eyes of the material.

2. A method as claimed in claim 1, further comprising the additional steps of trimming the material at both ends at the same time, before feeding the end heated material into the positioning device, feeding the trimmed material into an end reheating furnace, and reheating the ends of the material.

3. A method as claimed in claim 1 further comprising the additional steps of pouring water on the respective presses and dies as a coolant immediately before the operation thereof and lubricating all units and devices during the operation thereof, and removing scraps produced from the material at the respective units or devices.

4. An automatic eye forming apparatus for forming leaf springs with eyes at both ends, said apparatus comprising a shearing unit for cutting strip metal material in a predetermined length, a first transferring device for feeding the cut material into a punching unit, a punching unit for producing a center hole in the cut material, a second transferring device for feeding the material into an end heating furnace, a first positioning device for positioning the material longitudinally, an end heating furnace for heating both ends of the material, a swinging arm feeder for feeding the end heated material into a second positioning device, a second positioning device for positioning the material in the lateral and longitudinal directions, a first transferring slide for chucking the material at its center hole, and feeding it into a first working station, a first clamping device at the first working station for clamping the material on both sides of its center, bending presses at the first working station for curling the ends of the material and shearing units for cutting the ends of the curled material, a second transferring slide for chucking the material at its center hole and feeding it into a second working station, a second clamping the material on both sides of its center, an eye forming press at the second working station for forming eyes at both ends of the material, a third transferring slide for chucking the material at its center hole and feeding it into a third working station, a third clamping device at the third working station for clamping the material on both sides of its center, a final eye forming device at the third working station for forming an accurately shaped eye and comprising, at each end of the material a mandrel end receiver, a mandrel movable for insertion into the eye of the material and the mandrel end receiver, and three dies movable toward the eye on the material for pressing the periphery of the eye of the material.

5. An automatic eye forming apparatus as claimed in claim 4, further comprising, between said end heating furnace and said swinging arm feeder, a trimming unit for trimming the material at both ends at the same time, a third transferring device for feeding the material into an end reheating furnace, and an end reheating furnace for reheating both ends of the material.

6. An automatic eye forming apparatus as claimed in claim 4, further comprising a cooling system for cooling the respective dies and presses immediately before their operation, a lubricating system for providing lubrication for all of the units and devices, and a scrap remover for removing the scraps produced from the material.

7. A transferring slide for moving a leaf spring having a center hole therein, said slide comprising a slidable casing, an arm pivotally secured to shaft on said casing, a chucking arm integrally secured to said arm and being rotatable on the shaft for chucking the strip material, a rack, a driving pinion driven by the rack and having a lever thereon engageable with said arm for pushing the arm for chucking the strip material, a center pin, a cam for raising said center pin for inserting it into the center hole of the material, a rocker arm actuated by the cam, a link between the rocker arm and the center pin, a connecting rod for defining the motion of the chucking arm, and spring means engaging said connecting rod.

8. Eye forming equipment for forming an eye at both ends of a strip material comprising a plurality of transferring slides for feeding the strip material from one station to the next station, a positioning device for positioning the material in the lateral and longitudinal directions, a first working station having means thereat for curling both ends of the material and for cutting the curled material at both ends in a predetermined length from the center hole of the material, a second working station having means thereat for forming an eye at both ends of the material by pressing the curled material inwards from the outside, and a third working station having means thereat for forming an accurately shaped eye at both ends of the material by pressing the peripheries of the eyes of the material, said means including two sets of three dies and a mandrel and a mandrel end receiver.

9. Eye forming equipment as claimed in claim 8 in which said forming means at said third station comprises means for moving said mandrel end receiver in each set toward and away from the eye and for moving said mandrel through the eye of the material into said receiver and back out of said eye, and for first moving two of said dies against the peripheries of the eyes at the portion thereof furtherest from the end of the material and then for moving the last die against the periphery of the eye of the material, and for moving said dies away from the material.

References Cited

UNITED STATES PATENTS

| | | | |
|---|---|---|---|
| 2,160,781 | 5/1939 | Lukasiewicz | 72—307 |
| 3,118,327 | 1/1964 | Eastman | 72—405 |
| 3,159,198 | 12/1964 | Sutch | 72—405 |

DONALD D. OREFE, *Primary Examiner.*

U.S. Cl. X.R.

72—306, 338, 342, 364, 405